United States Patent
Sarkar et al.

(10) Patent No.: US 11,017,026 B2
(45) Date of Patent: *May 25, 2021

(54) HIGHLIGHTING PORTIONS OF A LIVE VIDEO BROADCAST

(71) Applicant: Facebook, Inc., Menlo Park, CA (US)

(72) Inventors: Shilpa Sarkar, San Francisco, CA (US); Ian McIntyre Silber, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/853,249

(22) Filed: Apr. 20, 2020

(65) Prior Publication Data
US 2020/0349192 A1    Nov. 5, 2020

Related U.S. Application Data

(63) Continuation of application No. 15/703,647, filed on Sep. 13, 2017, now Pat. No. 10,664,524.

(51) Int. Cl.
| | | |
|---|---|---|
| G06F 16/78 | (2019.01) | |
| G06Q 50/00 | (2012.01) | |
| H04L 29/06 | (2006.01) | |
| H04L 12/725 | (2013.01) | |
| H04L 29/08 | (2006.01) | |

(Continued)

(52) U.S. Cl.
CPC ...... *G06F 16/7867* (2019.01); *G06F 16/7864* (2019.01); *G06Q 50/01* (2013.01); *H04L 45/308* (2013.01); *H04L 65/4076* (2013.01); *H04L 65/4084* (2013.01); *H04L 65/607* (2013.01); *H04L 67/2804* (2013.01); *H04L 67/306* (2013.01); *H04W 4/21* (2018.02)

(58) Field of Classification Search
CPC . G06Q 50/01; H04L 65/4084; H04L 65/4076; H04L 67/306; H04L 45/308; G06F 16/7864; G06F 16/7867

See application file for complete search history.

(56) References Cited

U.S. PATENT DOCUMENTS

| | | | |
|---|---|---|---|
| 8,745,500 B1 * | 6/2014 | Kostello | G11B 27/34 715/723 |
| 2015/0188720 A1 | 7/2015 | Winter | |

(Continued)

OTHER PUBLICATIONS

Sherrets, D.J., Apr. 22, 2016. "Idea: Live Stream on Snapchat and tap button to create divider." Retrieved on Apr. 13, 2019 from < https://medium.conn/dj-sherrets/idea-live-streann-on-snapchat-and-tap-button-to-create-divider-s-so-playback-version-has-multipl55dff4d63b93> (Year: 2016).*

(Continued)

*Primary Examiner* — Shean Tokuta
*Assistant Examiner* — Juan C Turriate Gastulo
(74) *Attorney, Agent, or Firm* — Keller Jolley Preece

(57) ABSTRACT

The present disclosure is directed toward systems and methods for enabling better control over a live video broadcast. For example, systems and methods described herein enable a broadcaster to indicate one or more highlighted portions of a live video broadcast. Systems and method described herein further provide a video broadcast viewer the ability to scrub through the video broadcast directly to the highlighted portions of the live video broadcast.

20 Claims, 18 Drawing Sheets

(51) Int. Cl.
*G06F 16/783* (2019.01)
*H04W 4/21* (2018.01)

(56) References Cited

U.S. PATENT DOCUMENTS

| | | | |
|---|---|---|---|
| 2016/0099901 A1 | 4/2016 | Allen et al. | |
| 2016/0205431 A1* | 7/2016 | Avedissian | H04N 21/4312 |
| | | | 725/37 |
| 2016/0277802 A1 | 9/2016 | Bernstein et al. | |
| 2017/0257651 A1 | 9/2017 | Zhu et al. | |
| 2018/0025078 A1 | 1/2018 | Quennesson | |
| 2018/0199080 A1 | 7/2018 | Jackson, Jr. et al. | |
| 2019/0037173 A1 | 1/2019 | Lee et al. | |
| 2019/0052587 A1* | 2/2019 | Andreou | H04L 51/38 |
| 2019/0079941 A1 | 3/2019 | Sarkar et al. | |

OTHER PUBLICATIONS

Digitial Imaging Reporter, Jun. 17, 2016. "In-App Flipacam Ephemeral Camera Launches". Retrieved on Apr. 15, 2019 from <https://www.direporter.conn/products/innaging-apps/app-flipacam-ephemeral-camera-launches> (Year: 2016).

Constine, Josh, Aug. 2, 2016. "Instagram Launches Stories, a Snapchatty Feature for Imperfect Sharing". Retrieved on Apr. 13, 2019 from <https://web.archive.org/web/20160826194131/https://techcrunch.conn/2016/08/02/instagram-stories/> (Year: 2016).

Newton, Cassey, Nov. 6, 2015. "Periscope adds Fast-Forward and Rewind to replays on Android and Web". Retrieved on Apr. 15, 2019 from <https://www.theverge.com/2015/11/6/9684140/periscope-fast-forward-rewind-android> (Year: 2015).

9to5Mac, Youtube, Aug. 3, 2016. "How to use Instagram Stories-a step by step guide." Retrieved on Oct. 22, 2019 from < https://www.youtube.com/watch?v=oG8P5MZ9_cl> (Year: 2016).

Alfred Lua, Feb. 7, 2017. "What Counts as a Video View on Facebook, Instagram, Twitter, and Snapchat? The Buffer Guide to Video Metrics." Retrieved on Oct. 22, 2019 from <https://buffer.com/library/social-video-metrics> (Year: 2017).

U.S. Appl. No. 15/703,647, dated Apr. 22, 2019, Office Action.
U.S. Appl. No. 15/703,647, dated Oct. 29, 2019, Office Action.
U.S. Appl. No. 15/703,647, dated Jan. 23, 2020, Notice of Allowance.

* cited by examiner

HIGHLIGHTING PORTIONS OF A LIVE VIDEO BROADCAST

CROSS-REFERENCE TO RELATED APPLICATIONS

The present application is a continuation of U.S. application Ser. No. 15/703,647, filed on Sep. 13, 2017. The aforementioned application is hereby incorporated by reference in its entirety.

BACKGROUND

Many services and systems now exist that allow end users to capture and broadcast live video to friends or followers. For example, users find it very engaging to broadcast live video from their mobile phones for friends to watch. In this way, users are able to connect with each other in a manner not previously available. Several problems exist, however, with conventional live video broadcasting services. For example, a live video broadcaster generally has no control over his audience. Typically, when a user begins a live video broadcast, all of the user's friends and/or followers are notified regarding the live video broadcast. This is problematic for a broadcaster who does not wish to "spam" his friends with notifications.

Furthermore, viewers often lose interest in overly long live video broadcasts. For example, because of the unscripted nature of most live video broadcasts, there are often extended periods of the broadcasts that are boring or otherwise uninteresting for viewers. As a result, viewers must often endure these portions of little interest in order to enjoy the portions of greater interest. Because of this, many viewers will not watch the full video broadcast, thereby resulting in a reduced audience for the content shared by the broadcasting user in the live video broadcast.

Additional problems exist after a completed live video broadcast is made available as a recorded video. For example, once a live video broadcast completes and is made available as a recording, the broadcaster typically has no control over how long and in what manner the recording is available. This is inconvenient for broadcasters and may result in reduced viewership of broadcast recordings.

These and other disadvantages exist with regard to conventional live video broadcast services and systems.

SUMMARY

One or more embodiments described herein provide benefits and/or solve one or more of the foregoing or other problems in the art with systems and methods that allow end users to capture and broadcast live video to friends and followers. In some embodiments, the disclosed live video broadcast system provides users more control over live video broadcasts and corresponding audiences. For example, systems and methods described herein enable a broadcaster to select audience members to whom notifications related to the live broadcast video are provided. Thus, the broadcaster can ensure that all of his networking system friends are not "spammed" with regard to his live video broadcast.

Furthermore, one or more embodiments described herein enable video highlight selection during or after a live video broadcast. For example, systems and methods described herein enable a broadcaster to indicate the occurrence something funny, important, or otherwise interesting during the broadcast of the live video. Once the live video broadcast has ended, the broadcaster may select to share only highlighted portions of the live video broadcast, or may share a full recording of the video broadcast that includes indications of the highlighted portions. In some embodiments, systems and methods described herein can also automatically select one or more highlighted portions within a recording of a video broadcast based on networking system activity associated with portions of the video broadcast.

Additionally, one or more embodiments described herein provide the highlighted portions of the video broadcast for only a predetermined amount of time. For example, once a broadcaster shares one or more highlighted portions of the video broadcast, systems and methods described herein maintain the availability of those highlighted portions for only a predetermined amount of time. In particular, the user can choose to add the highlighted portions to an ephemeral content collection (e.g., a "story" or "day") including ephemeral content items accessible by other users for a predetermined amount of time after they are added to the ephemeral content collection. When the predetermined amount of time elapses, the disclosed system removes the highlighted portions from the broadcaster's ephemeral content collection, thereby making them unavailable to the broadcaster's friends or any other networking system user. Thus, one or more embodiments described herein provide the broadcaster with greater control over the distribution of his/her broadcast video content.

Additional features and advantages of the present application will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features can be obtained, a more particular description of the aspects of one or more embodiments briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of scope, one or more embodiments will be described and explained with additional specificity and detail through the use of the accompanying drawings in which.

DETAILED DESCRIPTION

Figure 1:
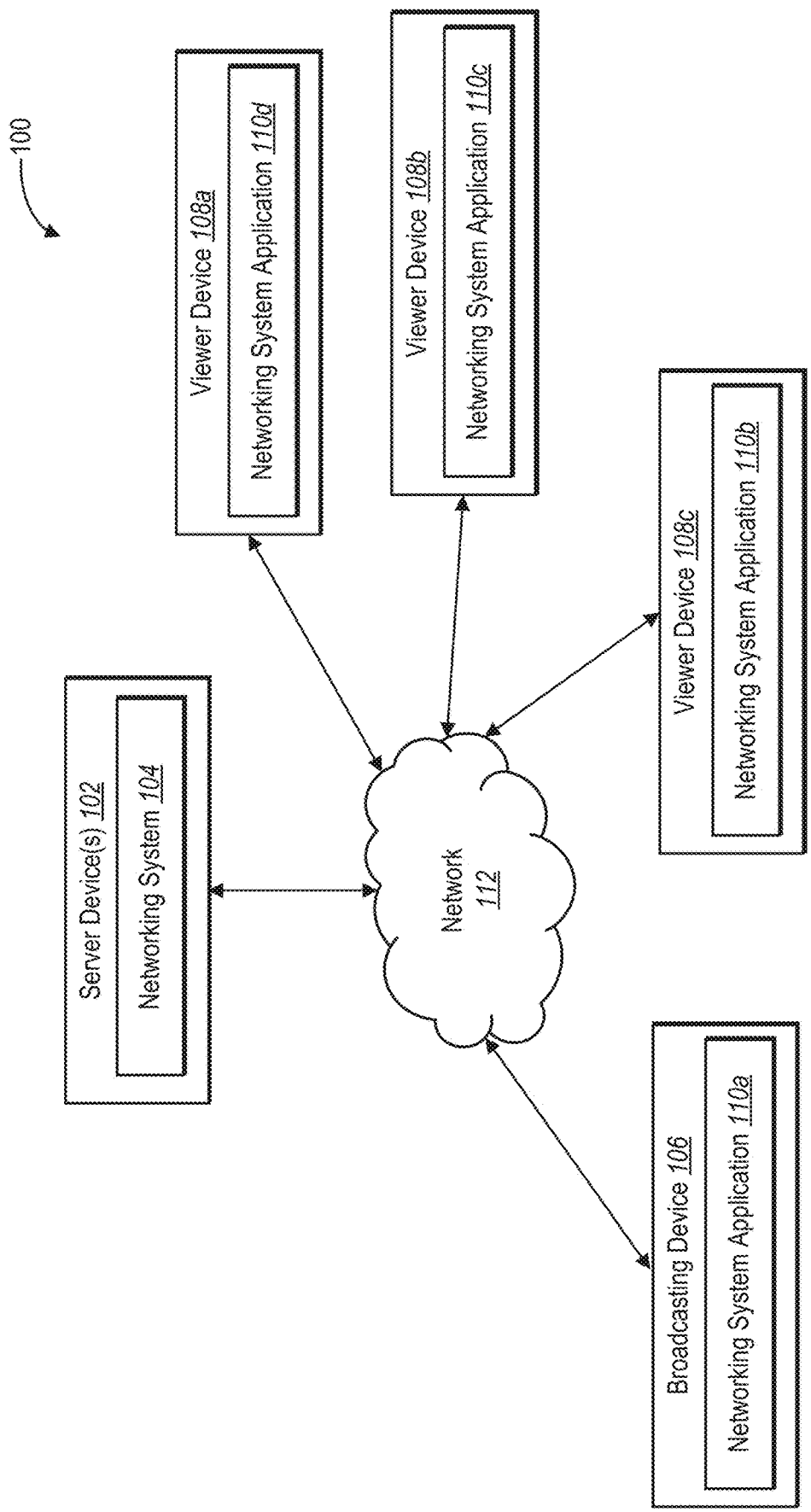
FIG. 1 illustrates an environmental diagram of a broadcast management system in accordance with one or more embodiments.

One or more embodiments described herein provide benefits and/or solve one or more of the foregoing or other problems in the art with systems and methods for enabling more creative control over live video broadcasts. For example, a broadcast management system described herein provides a video broadcaster the ability to notify selected viewers regarding a live video broadcast. Additionally, the broadcast management system enables a broadcaster to indicate one or more highlighted portions of a live video broadcast. Furthermore, the broadcast management system allows the broadcaster to have greater control over the availability of the live video broadcast content within a networking system.

Thus, the systems and methods described herein overcome many of the pitfalls common to conventional live video broadcast services and systems. For example, in one or more embodiments, the broadcast management system's robust set of options and features introduce efficiencies to the process of audience selection. For instance, with only a few touch gestures, a broadcaster can select a group of audience members to notify regarding the live video broadcast. Similarly, in one or more embodiments, the broadcast management system provides a quick, efficient, and easy way for a broadcaster to indicate a highlighted portion of a live video broadcast. Again, with only a minimal amount of interaction, the broadcaster can indicate a highlight—as it occurs—in a live video broadcast. This means that the broadcaster does not need to waste time in reviewing or editing after the live video broadcast ends. Furthermore, in one or more embodiments, the broadcast management system provides the broadcaster with options for adding the highlighted portions of the live video broadcast to an ephemeral content collection belonging to the user. Thus, the broadcaster can further promote content from the live video broadcast through multiple channels/platforms.

To illustrate an example of the broadcast management system, in response to detecting the initiation of a live video broadcast from a broadcasting client device, the broadcast management system utilizes networking system activity associated with the broadcaster to generate a list of networking system co-users who the broadcaster can invite to view the live video broadcast. In one or more embodiments, and in response to the broadcaster selecting one or more co-users from the generated list, the broadcast management system provides notifications to the selected co-users regarding the live video broadcast. The selected networking system co-users, and other co-users who happen upon the live video broadcast, can view or stream the live video broadcast in real-time.

During the live video broadcast, the broadcast management system enables the broadcaster to indicate when a highlighted portion of the live video broadcast is occurring. For example, when something interesting occurs during the live video broadcast, the broadcaster can press-and-hold (or otherwise interact with) a display element in the live video broadcast display to indicate the occurrence and/or duration of the highlighted portion of the live video broadcast. A highlighted portion may occur when the broadcaster says something important, when something funny occurs, when someone else does or says something important, and so forth. In at least one embodiment, the broadcast management system can pad the indicated highlighted portion such that the resulting video highlight includes a number of seconds before and after when the broadcaster selected the display element. Thus, the broadcaster can indicate a highlighted portion of the live video broadcast even when the broadcaster does not immediately recognize that a highlight is occurring.

In one or more embodiments, in addition to enabling the broadcaster to manually indicate a highlighted portion of a live video broadcast, the broadcast management system automatically identifies highlighted portions of the live video broadcast based on networking system activity. For example, during the live video broadcast, audience members may engage in networking system activity (e.g., comments, "likes," etc.) related to the live video broadcast. In at least one embodiment, the broadcast management system may determine that a highlighted portion occurs during a portion of the live video broadcast that corresponds with a threshold amount of networking system activity (e.g., a threshold number or rate of likes within a certain time period).

In one or more embodiments, when the broadcaster ends the live video broadcast, the broadcast management system provides a variety of options with regard to how the now-recorded video broadcast may be shared. In addition to sharing the entire video broadcast through conventional means (e.g., adding it to the broadcaster's profile or page), the broadcast management system provides options for the broadcaster to add content from the live video broadcast to via an ephemeral content collection associated with the broadcaster. For example, the broadcast management system can provide the broadcaster with an option to share the entire recording of the video broadcast including indications of the one or more highlighted portions via the broadcaster's ephemeral content collection, an option to review the one or more highlighted portions from the video broadcast, and an option to only share the one or more highlighted portions and not the full recording of the video broadcast via the broadcaster's ephemeral content collection.

For example, in order to enable the broadcaster to share some or all of a live video broadcast after the live video broadcast has ended, the broadcast management system generates an ephemeral content collection associated with the broadcaster. As used herein, an "ephemeral content collection" refers to a first-in-first-out collection of content that is available to the broadcaster's networking system co-users (e.g., friends or followers) for a limited amount of time (e.g., in some embodiments the broadcaster's ephemeral content collection is referred to as the broadcaster's "story" or "day" within a networking system). For example, in one or more embodiments, the broadcast management system generates the broadcaster's ephemeral content collection, to which the broadcaster can add any number of ephemeral digital media items (e.g., digital photographs and digital videos).

In one or more embodiments, a broadcaster's ephemeral content collection is different from the broadcaster's conventional profile in that a digital media item added to the broadcaster's ephemeral content collection is only available to be viewed for a threshold amount of time. When the threshold amount of time expires, the broadcast management system removes the digital media item from the broadcaster's ephemeral content collection and the digital media item is no longer viewable within the networking system. If added to the broadcaster's profile, the same digital media item would be available for viewing indefinitely.

Furthermore, in one or more embodiments, the broadcast management system configures the broadcaster's ephemeral content collection such that any digital media item added to the ephemeral content collection is viewable for a threshold amount of time before the broadcast management system removes the digital media item from the ephemeral content collection. For example, if the threshold amount of time is twenty-four hours and the broadcaster adds a digital photograph to his ephemeral content collection, the broadcast management system will display the digital photograph within the broadcaster's ephemeral content collection for twenty-four hours from the time the broadcaster added the digital photograph. Once the threshold amount of time expires, the broadcast management system will remove the digital media item from the broadcaster's ephemeral content collection, thus making the digital media item unavailable within the networking system. When the broadcaster adds multiple digital media items to the ephemeral content collection, the broadcast management system removes each media item in a first-in-first-out manner, based on the threshold amount of time expiring for each media item.

In response to the broadcaster selecting one of the sharing options following the conclusion of the live video broadcast, the broadcast management system makes at least one of the highlighted portions available to the broadcaster's networking system co-users for a predetermined amount of time via the broadcaster's ephemeral content collection. For example, in response to the broadcaster selecting to share only the highlighted portions of a video broadcast, the broadcast management system automatically adds each of the highlighted portions of the video broadcast to the broadcaster's ephemeral content collection. In response to the broadcaster selecting to share the full recording of the video broadcast including the highlighted portions, the broadcast management system adds the full recording with or without indications of the highlighted portions to the broadcaster's ephemeral content collection, which recording may then be accessed for a predetermined period of time. The broadcast management system can include an option to watch the full recording of the broadcast video and to scrub backwards and forwards to the included highlighted portions. When the predetermined amount of time elapses, the broadcast management system removes the recording of the broadcast video and/or the highlighted portions of the broadcast video from the broadcaster's ephemeral content collection.

Thus, in one or more embodiments, the broadcaster's networking system co-users (e.g., followers) can access and view the broadcaster's ephemeral content collection. In response to a co-user accessing the broadcaster's ephemeral content collection, the broadcast management system displays each digital media item within the collection for a threshold amount of time before displaying the next media item. In at least one embodiment, the broadcast management system provides an ephemeral content collection timeline including one or more segments. For example, each segment in the ephemeral content collection timeline corresponds to a digital media item in the ephemeral content collection. The broadcast management system can highlight the segment that corresponds to the currently displayed digital media item in the broadcaster's ephemeral content collection in order to indicate to the viewer how far into the collection the currently displayed digital media item is and how many remaining digital media items have yet to be displayed.

When the broadcast management system displays a recording of a live video broadcast within the broadcaster's ephemeral content collection, the broadcast management system can dynamically update the ephemeral content collection timeline in order to indicate one or more highlighted portions to the viewer. For example, in one or more embodiments, during playback of a recording of a live video broadcast, the broadcast management system replaces the ephemeral content collection timeline with a video broadcast recording timeline that includes one or more highlighted portion indicators. The one or more highlighted portion indicators show the viewer the location and duration of each highlighted portion of the now-recorded live video broadcast. In at least one embodiment, the broadcast management system enables the viewer to scrub back and forth within the recording in order to view the highlighted portions.

Accordingly, the broadcast management system includes options and features that enable a broadcaster to seamlessly indicate one or more highlighted portions of a live video broadcast in a way that does not distract the broadcaster from what he is doing or saying in the live video broadcast. Furthermore, the broadcast management system enables the broadcaster to quickly and easily share the one or more highlighted portions of the live video broadcast once the broadcast has ended via an ephemeral content collection that only displays the highlighted portions for a limited time. Thus, the broadcast management system alleviates many common accessibility concerns common to live video broadcasters.

FIG. 1 illustrates an example block diagram of an environment for implementing the broadcast management system 100. As illustrated in FIG. 1, the broadcast management system 100 includes a server device(s) 102 hosting a networking system 104. Further shown in FIG. 1, the broadcast management system 100 also includes a broadcasting device 106 and viewer devices 108*a*, 108*b*, and 108*c*. Each of the broadcasting device 106 and the viewer devices 108*a*, 108*b*, and 108*c* include a networking system application 110*a*-110*d*, respectively.

The broadcasting device 106, the viewer devices 108*a*-108*c*, and the server device 102 communicate via a network 112, which may include one or more networks and may use one or more communication platforms or technologies suitable for transmitting data and/or communication signals. In one or more embodiments, the network 112 includes the Internet or World Wide Web. The network 112, however, can include various other types of networks that use various communication technologies and protocols, such as a corporate intranet, a virtual private network ("VPN"), a local area network ("LAN"), a wireless local network ("WLAN"), a cellular network, a wide area network ("WAN"), a metropolitan area network ("MAN"), or a combination of two or more such networks. Additional details relating to the network 112 are explained below with reference to FIG. 10.

Although FIG. 1 illustrates a particular number and arrangement of devices, in additional embodiments the broadcasting device 106 and the viewer devices 108*a*-108*c* may directly communicate with the server device 102, bypassing the network 112. Further, in other embodiments, the broadcast management system 100 may include any number of viewer devices as well as additional client devices authorized to interact with the broadcasting device 106, the detail of which will be provided further below. Additionally, in other embodiments, any of the viewer devices 108a-108c may act as broadcasting devices. In other words, in at least one embodiment, the networking system application 110 enables a client-computing device to act as a broadcasting device or a viewer device.

In one or more embodiments, the broadcasting device 106 and the viewer devices 108a-108c is one of various types of computing devices. For example, each of the broadcasting device 106 and the viewer devices 108a-108c may include a mobile device, such as a mobile telephone, a smartphone, a PDA, a tablet computing device, or a laptop computer. Additionally or alternatively, the broadcasting device 106 and the viewer devices 108a-108c may include a non-mobile device such as a desktop computer, a server computing device, or another type of computing device. It will be understood that the broadcasting device 106 and the viewer devices 108a-108c can include the same type of computing functionality. In other words, in a preferred embodiment, the broadcasting device 106 and the viewer devices 108a-108c are mobile computing devices such as smartphones and/or tablets.

In one or more embodiments, the broadcasting device 106 is the computing device where a live video broadcast originates, while the viewer devices 108a-108c are the computing devices where the live video broadcast is viewed. For example, a broadcaster initiates a live video broadcast on the broadcasting device 106 and the resulting broadcast is viewed by one or more users on a display of the viewer devices 108a, 108b, and 108c. In at least one embodiment, the user of the broadcasting device 106 (e.g., the broadcaster) and the users of the viewer devices 108a-108c (e.g., the viewers) are associated (e.g., "friends") via the networking system 104. Additional details with respect to the broadcasting device 106 and the viewer devices 108a-108c are discussed below with respect to FIG. 9.

As will be described in more detail below, the components of the broadcasting management system 100 provides, along and/or in combination with the other components, one or more graphical user interfaces ("GUIs"). In particular, the networking system application 110a, 110b, and 110c displays one or more GUIs generated by the networking system 104 and/or the networking system applications 110a-110c. The networking system application 110a (e.g., associated with the broadcaster) and the networking system applications 110b and 110c (e.g., associated with the viewers) enable users (e.g., whether the broadcaster or the viewers) to interact with a collection of display elements provided within one or more GUIs for a variety of purposes. FIGS. 2A-4E and the description that follows illustrate various example embodiments of the GUIs that are used to describe the various features of the broadcast management system 100.

As mentioned above, the networking system 104 enables a broadcaster to initiate a live video broadcast from the broadcasting device 106. As used herein, a "live video broadcast" refers to a real-time video stream initiated at a client-computing device and provided to additional client-computing devices by a central host (e.g., the networking system 104). Also as used herein, the term "broadcaster" means a user of the networking system 104 who initiates or otherwise provides a live video presentation or stream at the broadcasting device 106. The broadcaster can be a person, merchant, business, or other organization. Also as used herein, the term "viewer" means a user of the networking system 104 who views a live video broadcast via the networking system 104. In one or more embodiments, in response to the broadcaster initiating a live video broadcast, the broadcast management system 100 provides a GUI including a display of the live video broadcast to client-computing devices associated with the broadcaster and one or more viewers. Furthermore, in at least one embodiment, the broadcast management system 100 provides different GUI functionality to the broadcaster than to the one or more viewers.

Figure 2B:
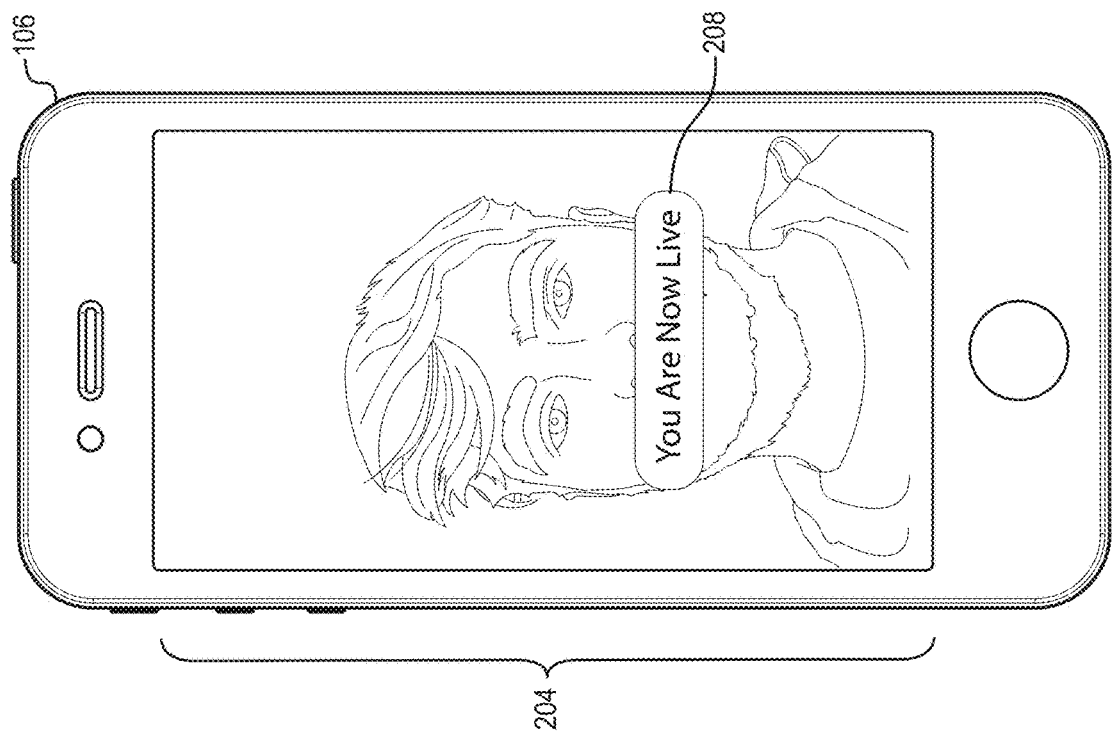
FIGS. 2A-2F illustrate a series of graphical user interfaces illustrating various features of one embodiment of the broadcast management system.
Figure 2A:
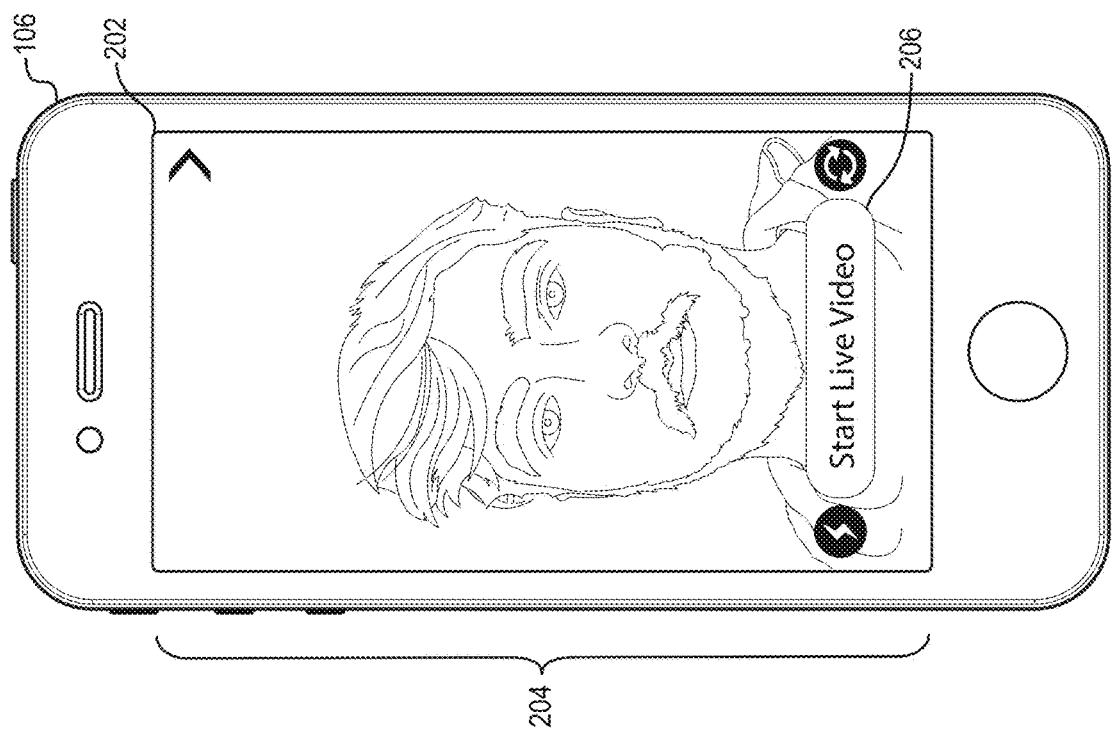

For example, as illustrated in FIG. 2A, the broadcasting device 106 includes a touch screen display 202. In one or more embodiments, the broadcasting management system 100 provides the live video broadcast GUI 204 on the touch screen display 202 of the broadcasting device 106. For instance, the live video broadcast GUI 204 displays a real-time view of the video stream emanating from the broadcasting device 106. As shown in FIG. 2A, the live video broadcast GUI 204 includes a video stream of either the front-facing camera view (e.g., meaning the person depicted in the live video broadcast GUI 204 is the broadcaster looking at himself in the live video broadcast GUI 204 while the holding the broadcasting device 106), or the rear-facing camera view (e.g., meaning the broadcaster is pointing the broadcasting device 106 at the person depicted in the live video broadcast GUI 204).

In one or more embodiments, the broadcasting management system 100 provides the real-time view of the video stream captured by a camera of the broadcasting device 106 as soon as the broadcaster initializes the live video broadcast GUI 204 and prior to the beginning of the live video broadcast. This gives the broadcaster an opportunity to correctly frame the subject matter of the broadcast, correct lighting, and so forth. When the broadcaster is ready to initiate the live video broadcast, the user can select the start live video button 206. In response to the detected selection of the start live video button 206, the broadcast management system 100 provides the real-time view of the video stream emanating from the broadcasting device 106 to the networking system 104 for broadcast to one or more networking system co-users of the broadcaster. In at least one embodiment, in response to successfully providing the real-time view of the video stream emanating from the broadcasting device 106 to the networking system 104, the broadcasting management system 100 can provide the now live notification 208 in the live video broadcast GUI 204, as shown in FIG. 2B.

Figure 2D:
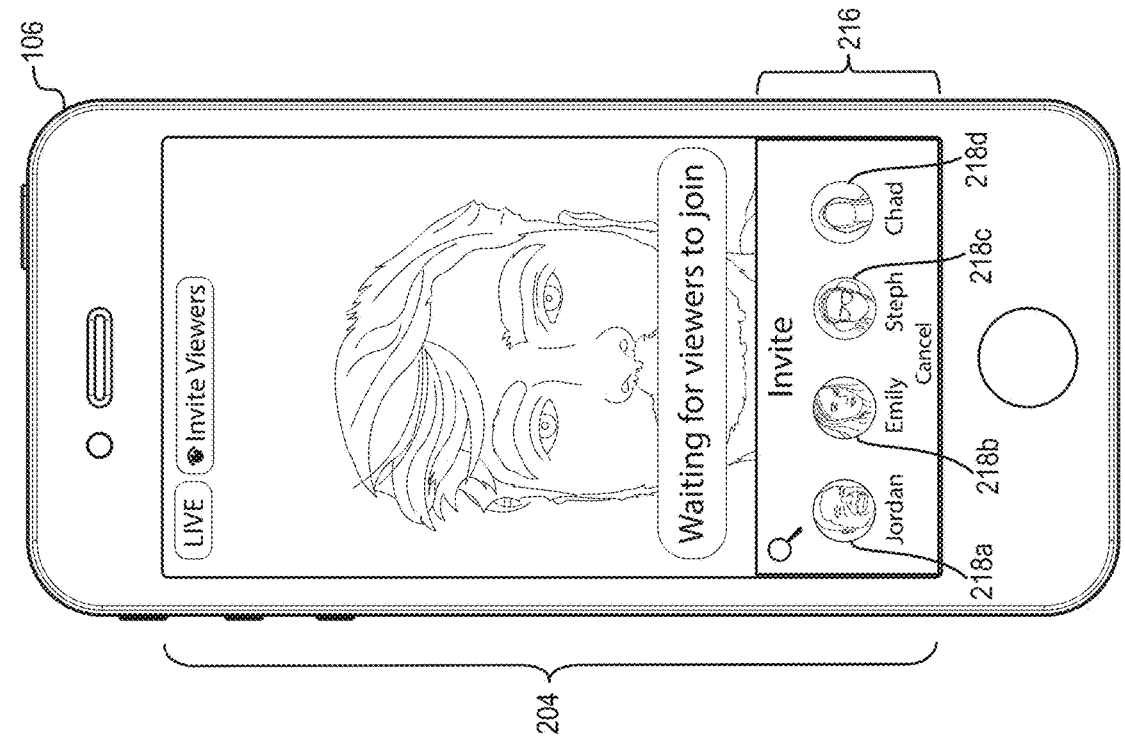
Figure 2C:
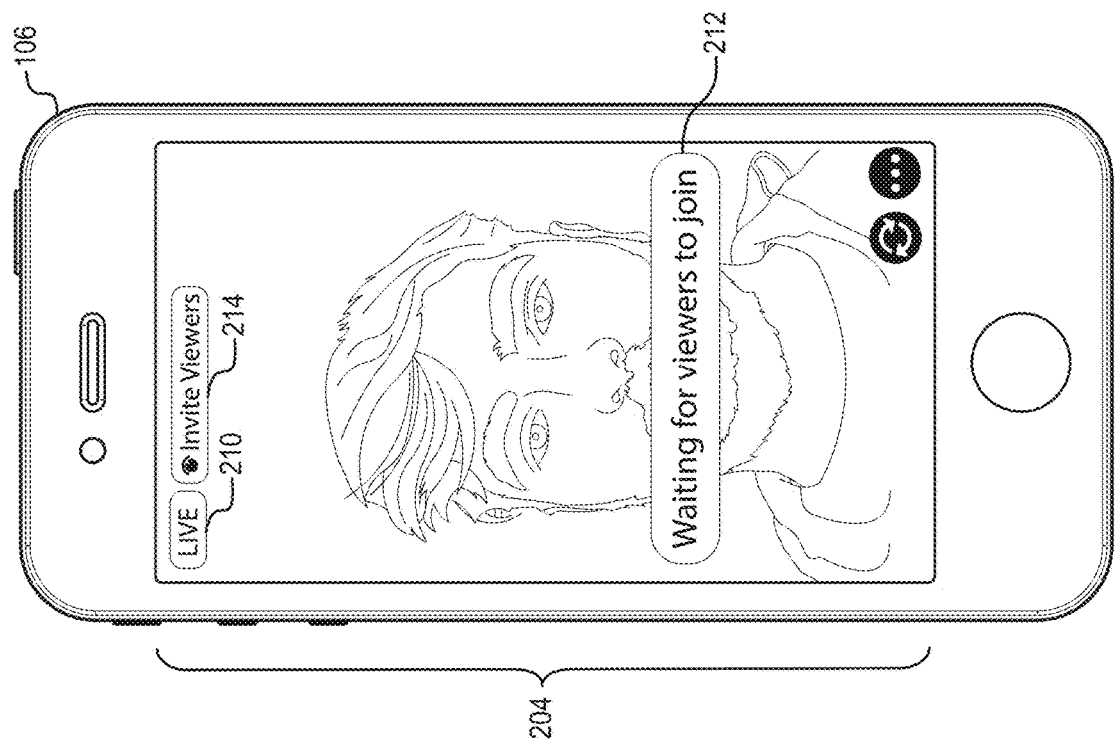

Additionally, for the duration of the live video broadcast, the broadcasting management system 100 provides the live indicator 210 in the live video broadcast GUI 204, as shown in FIG. 2C. In one or more embodiments, the live indicator 210 informs the broadcaster that the video broadcast is live and is being streamed in real-time. In the event that there is a problem with the live video broadcast (e.g., the broadcasting device 106 loses connectivity, there is a problem at the networking system 104, etc.), the broadcasting management system 100 removes the live indicator 210 from the live video broadcast GUI 204, effectively informing the broadcaster that the video broadcast is not streaming. Thus, the broadcaster will know that he or she is not actually broadcasting, even though the live video broadcast GUI 204 may continue to display the real-time view of the video stream emanating from the broadcasting device 106.

In one or more embodiments, the broadcast management system 100 provides a live video broadcast even when there are no viewers actively watching the live video broadcast. In other words, broadcast management system 100 does not require that a broadcaster have an audience assembled prior to providing the live video broadcast. In that case, the broadcast management system 100 informs the broadcaster that there are currently no viewers of the live video broadcast with the waiting for viewers notification 212.

In one embodiment, the broadcast management system 100 may notify all of the broadcaster's networking system co-users (e.g., the broadcaster's "friends") as soon as the networking system 104 makes the broadcaster's live video broadcast available. For example, the broadcast management system 100 may cause a pop-up notification (or icon, alert, email, message, etc.) to appear on the displays of the viewer devices 108a-108c informing the users of those devices that the broadcaster is currently broadcasting a live video. Despite this, as mentioned above, the broadcaster may not wish for this type of notification to be provided to all of his friends. In other words, the broadcaster may decide that this type of notification would be considered "spam" (e.g., unwanted and/or intrusive) by most of his networking system friends.

Accordingly, in one or more embodiments, the broadcasting management system 100 provides the invite viewers button 214 on the live video broadcast GUI 204. In at least one embodiment, the broadcast management system 100 only provides one or more notifications to the viewers who are explicitly invited by the broadcaster to view the live video broadcast. For example, in response to the detected selection of the invite viewers button 214, the broadcast management system 100 provides the invite viewers list 216 including the viewer icons 218a-218d, as shown in FIG. 2D. Then, in response to the detected selection of any of the viewer icons 218a-218d, the broadcast management system 100 provides a notification regarding the live video broadcast only to the networking system users associated with the selected viewer icons.

The broadcast management system 100 determines to include the viewer icons 218a-218d in the invite viewers list 216 in a number of ways. In one embodiment, the broadcast management system 100 provides the viewer icons 218a-218d in response analyzing networking system activity information associated with the broadcaster and each of the networking system users associated with the viewer icons 218a-218d. For example, the broadcast management system 100 may provide the viewer icons 218a-218d in response to determining that the networking system users associated with the viewer icons 218a-218d were the last "friends" with whom the broadcaster exchanged electronic communications (e.g., instant messages, chats, private networking system messages, etc.). In another example, the broadcast management system 100 may provide the viewer icons 218a-218d in response to determining that the networking system users associated with the viewer icons 218a-218d viewed the broadcaster's last live video broadcast. In another example, the broadcast management system 100 may provide the viewer icons 218a-218d in response to determining that the networking system users associated with the viewer icons 218a-218d were the last "friends" to interact with the broadcaster via the networking system 104 (e.g., they were the last friends to comment on one of the broadcaster's posts, they were the last friends to "like" one of the broadcaster's uploaded pictures or videos, etc.).

In yet another example, the broadcast management system 100 may provide the viewer icons 218a-218d in response to an analysis of a networking system coefficient associated with the broadcaster and each of the networking system users associated with the viewer icons 218a-218d. In one or more embodiments, the networking system coefficient represents the strength and depth of a networking system relationship between two networking system users. For example, two networking system users who frequently interact via the networking system 104 (e.g., with post comments and likes, electronic messages, post shares, etc.) may have a high networking system coefficient. The networking system coefficient may also be influenced by user's profile information (e.g., users may have profile information indicating they are romantically involved, are related, work for the same company, attend the same school, live in the same geographical area, etc.), and/or by the number of networking system friends they have in common. In one or more embodiments, the broadcast management system 100 may provide the viewer icons 218a-218d in response to determining that the networking system users associated with the viewer icons 218a-218d have the highest networking system coefficient with the broadcaster.

As discussed above, in response to the broadcaster selecting any of the viewer icons 218a-218d, the broadcast management system 100 will provide a notification regarding the live video broadcast only to those networking system users associated with the selected view icons. For example, in response to the broadcaster selecting the viewer icons 218a, 218b, and 218c, the broadcast management system 100 will provide notifications to the networking system users associated with the viewer icons 218a, 218b, and 218c. Then, as shown in FIG. 2E, when those networking system users access or view the live video broadcast, the broadcast management system 100 provides the viewer indicators 222a, 222b, and 222c associated with those same networking system users on the live video broadcast GUI 204.

Figure 2F:
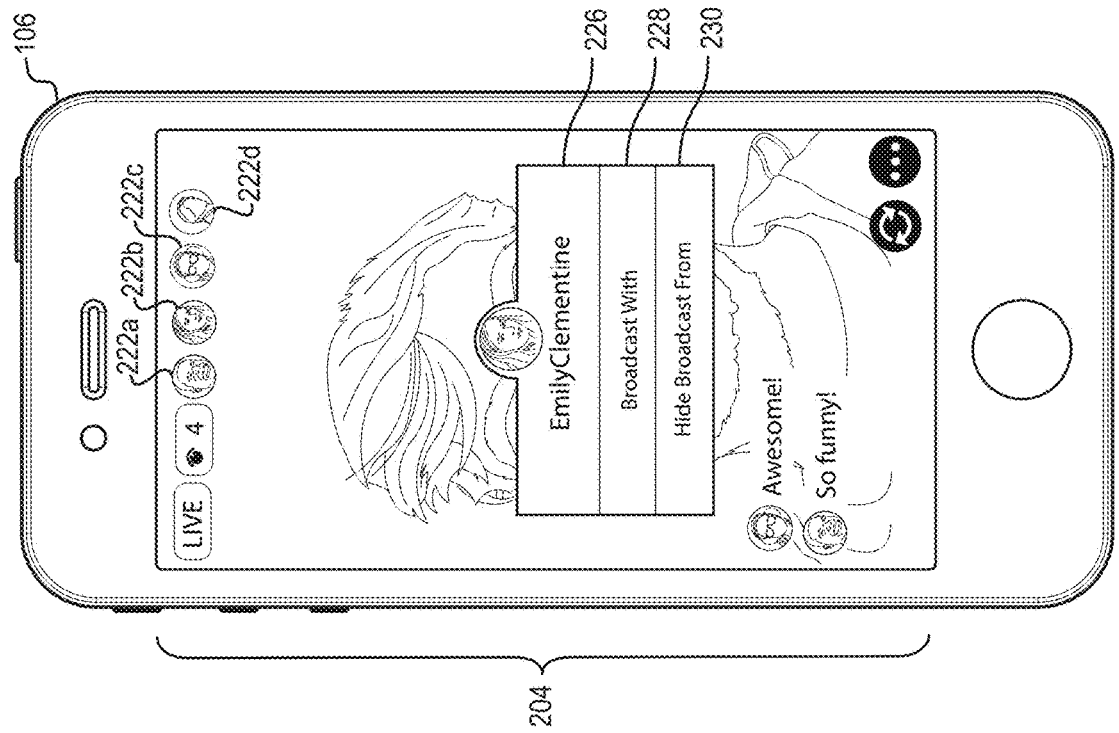
Figure 2E:
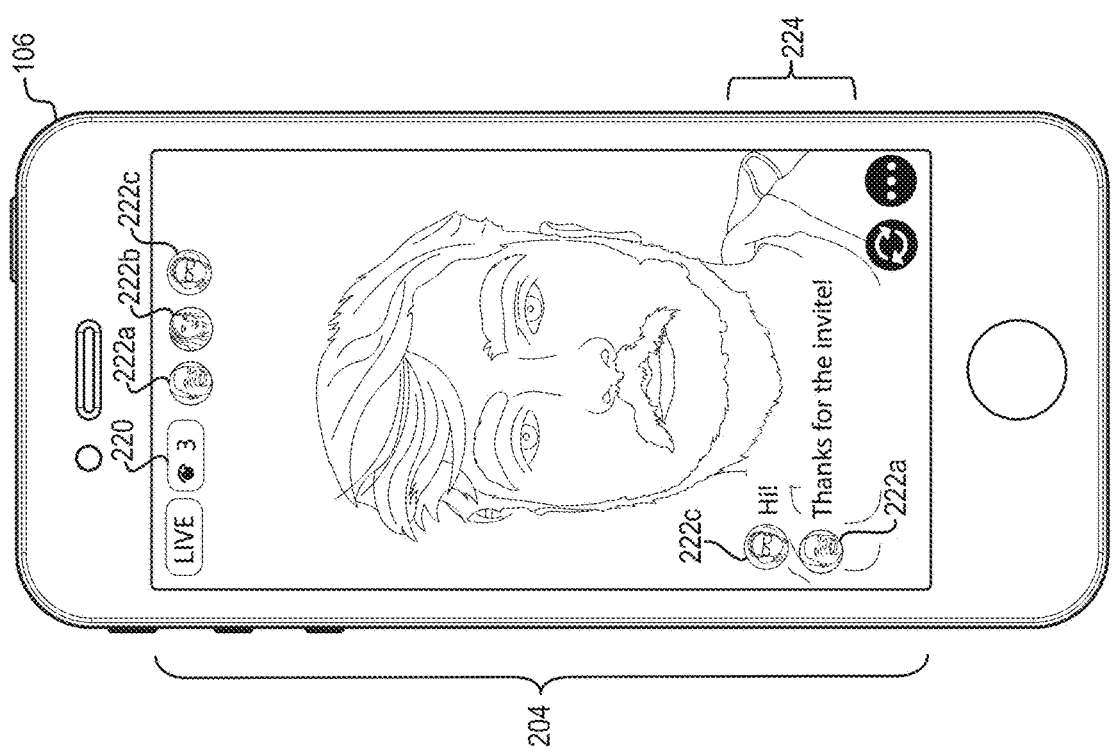

In one or more embodiments, the broadcasting management system 100 provides the viewer indicators 222a-222c on the live video broadcast GUI 204 in order to keep the broadcaster apprised of the identities of some or all of the viewers of the live video broadcast, as shown in FIG. 2E. In one embodiment, the broadcasting management system 100 may only provide viewer indicators on the live video broadcast GUI 204 associated with viewers who have been watching the live video broadcast for the longest amount of time. In another embodiment, the broadcasting management system 100 may provide viewer indicators on the live video broadcast GUI 204 associated with viewers who have the networking system coefficients with the broadcaster above a threshold amount. In yet another embodiment, the broadcasting management system 100 may provide viewer indicators on the live video broadcast GUI 204 associated with each current viewer of the live video broadcast in a horizontal slide bar such that the broadcaster can peruse the current viewers by performing a side-flick touch gesture. Furthermore, as shown in FIG. 2E, the broadcast management system 100 provides the audience indicator 220 including the total real-time number of viewers of the live video broadcast. This provides the broadcaster with a quick way to see the number of viewers who are watching the broadcast moment-to-moment.

As further illustrated in FIG. 2E, the broadcast management system 100 enables viewers of a live video broadcast to engage in networking system activities in connection with the live video broadcast. For example, viewers can comment on the live video broadcast while the broadcast is on-going. In that case, as shown in FIG. 2E, the broadcast management system 100 provides the comments listing 224 in the live video broadcast GUI 204 in order to display the received viewer comments in real-time to the broadcaster.

In one or more embodiments, the comments listing 224 remains in only the lower portion (e.g., the lower half) of the live video broadcast GUI 204 so as to not take up too much of the display of the live video broadcast. Alternatively, in one embodiment, the comments listing 224 expands to take up all the live video broadcast GUI 204 (e.g., as foreground with the display of the live video broadcast in the background) such that the broadcaster can view a maximum number of comments. Regardless of the amount of display taken by the comments listing 224, the comments listing 224 includes newest comments at the bottom of the comments listing 224 and oldest comments at the top of the comments listing 224.

In one embodiment, the broadcast management system 100 may only display each received comment for a threshold amount of time (e.g., 10 seconds) before removing the comment from the comments listing in order to maximize the display of the live video broadcast. In yet another embodiment, in order to prolong the display of comments for the broadcaster, the broadcast management system 100 may display each received comment for as long as possible before the comment is displaced by a new incoming comment in the comments listing 224. Furthermore, as shown in FIG. 2E, each comment in the comments listing 224 includes a viewer indicator (e.g., the viewer indicators 222c and 222a) associated with the networking system user who submitted the comment.

In at least one embodiment, the broadcast management system 100 automatically identifies highlighted portions of a live video broadcast based on networking system activities associated with the live video broadcast. For example, in response to determining that a portion of the live video broadcast is associated with a threshold number or peak number of networking system activities, the broadcast management system 100 can determine that that portion of the live video broadcast is a highlighted portion. This embodiment is advantageous for broadcasters who are not able to manually indicate one or more highlighted portions of the live video broadcast during the live video broadcast.

As mentioned above, the live video broadcast audience is not limited to those networking system users associated with the selected viewer icons 218a-218c. In one or more embodiments, the broadcast management system 100 may provide a display of the live video broadcast as part of a networking system post that is included in a newsfeed of each networking system co-user of the broadcaster. In that case, any of the broadcaster's networking system co-users (e.g., "friends") may happen upon the post including the display of the currently live video broadcast. Thus, additional networking system users not explicitly invited by the broadcaster may also view the live video broadcast. In one or more embodiments, when additional viewers "tune in" to the live video broadcast, the broadcast management system 100 adds a viewer indicator for each additional viewer to the live video broadcast GUI 204, as shown with the viewer indicator 222d in FIG. 2F.

Additionally, in at least one embodiment, the broadcast management system 100 includes the ability to enable the broadcaster to split the live video broadcast with another networking system user. For example, as shown in FIG. 2F, in response to a detected selection of one of the viewer indicators 222a-222d, the broadcast management system 100 provides the viewer options dialog 226 with various options pertaining to the networking system user associated with the selected viewer indicator (e.g., the networking system user "EmilyClementine"). In response to the detected selection of the broadcast with option 228, the broadcast management system 100 splits the live video broadcast initiated by the user of the broadcasting device 106 with the networking system user indicated by the viewer options dialog 226.

In one or more embodiments, the broadcast management system 100 splits the live video broadcast by providing a notification including a selectable option to the indicated networking system user. In response to the indicated networking system user selecting the option to broadcast with the user of the broadcasting device 106, the broadcast management system 100 provides a live video broadcast GUI for display on a client-computing device associated with the indicated networking system user. In one or more embodiments, the resulting split live video broadcast includes a split screen display including a live stream from the broadcaster via the broadcasting device 106 and a live stream from the indicated networking system user via that user's client-computing device. In at least one embodiment, the broadcaster splits the live video broadcast multiple times with as many additional networking system users as can reasonably be accommodated in a single display.

Alternatively, the broadcast management system 100 enables the broadcaster to remove one or more viewers from the audience of the live video broadcast. For example, as shown in FIG. 2F, in response to the detected selection of the hide broadcast option 230, the broadcast management system 100 will block the networking system user associated with the viewer options dialog 226 from viewing the live video broadcast initiated by the broadcaster. In one or more embodiments, the broadcast management system 100 blocks a viewer by removing the display of the live video broadcast from the viewer's client-computing device. Additionally, in some embodiments, the broadcaster configures the broadcast management system 100 to provide a notification to each blocked viewer (e.g., "The broadcaster has blocked you from this live video broadcast.") Furthermore, in some embodiments, the broadcast management system 100 also blocks the same viewer from viewing future recordings of the now-live video broadcast provided via the networking system 104. In at least one embodiment, each blocked viewer will remain blocked from all of the broadcaster's future live video broadcasts, unless or until the broadcaster explicitly invites the blocked viewer to again view a live video broadcast.

As mentioned above, in one or more embodiments, the broadcast management system 100 enables the broadcaster to indicate one or more highlighted portions of a live video broadcast. This functionality is illustrated in greater detail in FIGS. 3A-3H. For example, in a 6-minute live video broadcast, there may only be two 15-second portions of the broadcast that include subject matter that is truly of note (e.g., a highlight). To illustrate, in a live video broadcast of a skateboarder performing a difficult trick, there may be several minutes of the skateboarder warming up, followed by a 10-second portion of the broadcast showing the skateboarder actually performing the trick. In one or more embodiments, the broadcaster may consider that 10-second portion to be the highlight of the entire live video broadcast.

In order to enable the broadcaster to indicate one or more highlighted portions of a live video broadcast, the broadcast management system 100 detects user interactions in connection with the live video broadcast GUI 204. For example, as shown in FIG. 3A, the broadcaster is performing a live video broadcast as shown in the live video broadcast GUI 204 on the touch screen display 202 of the broadcasting device 106. At some point during the live video broadcast, the broadcaster can indicate a highlighted portion of the broadcast by performing a press-and-hold touch gesture with his finger 232 anywhere on the touch screen display 202, as shown in FIG. 3B.

Figure 3B:
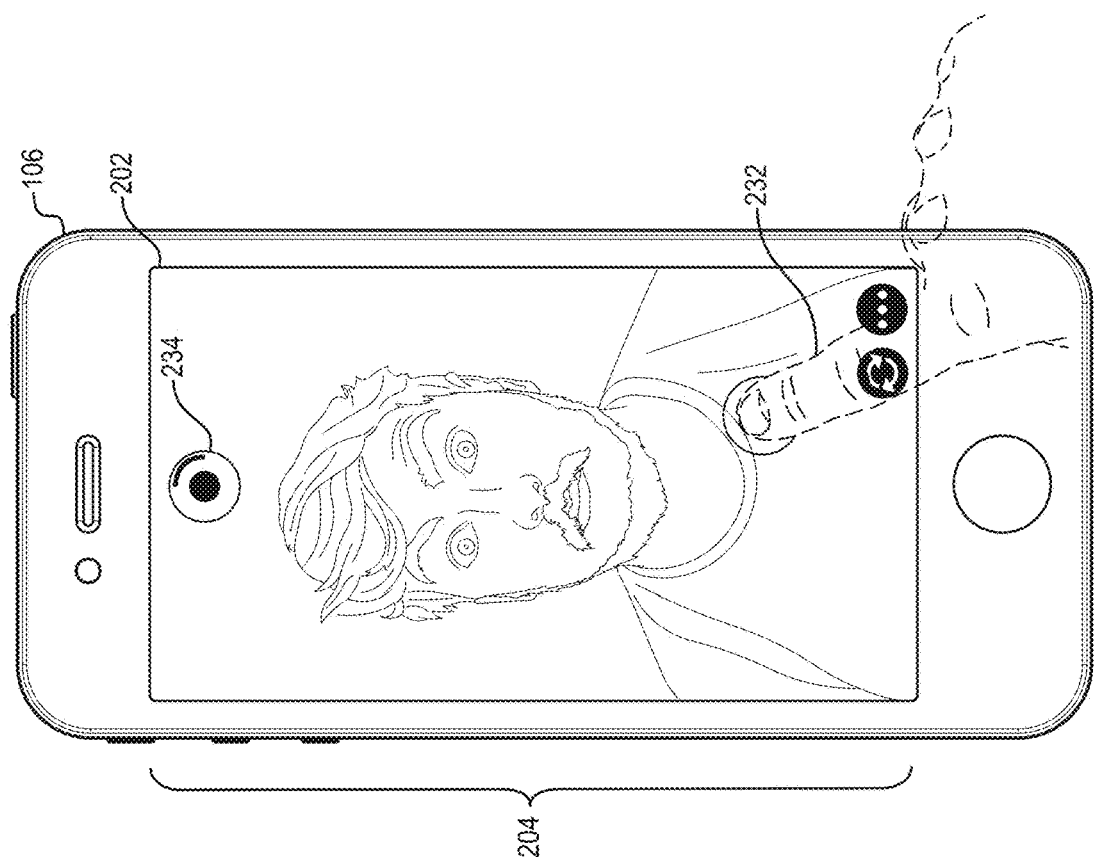
FIGS. 3A-3H illustrate a series of graphical user interfaces illustrating various features of one embodiment of the broadcast management system.
Figure 3A:
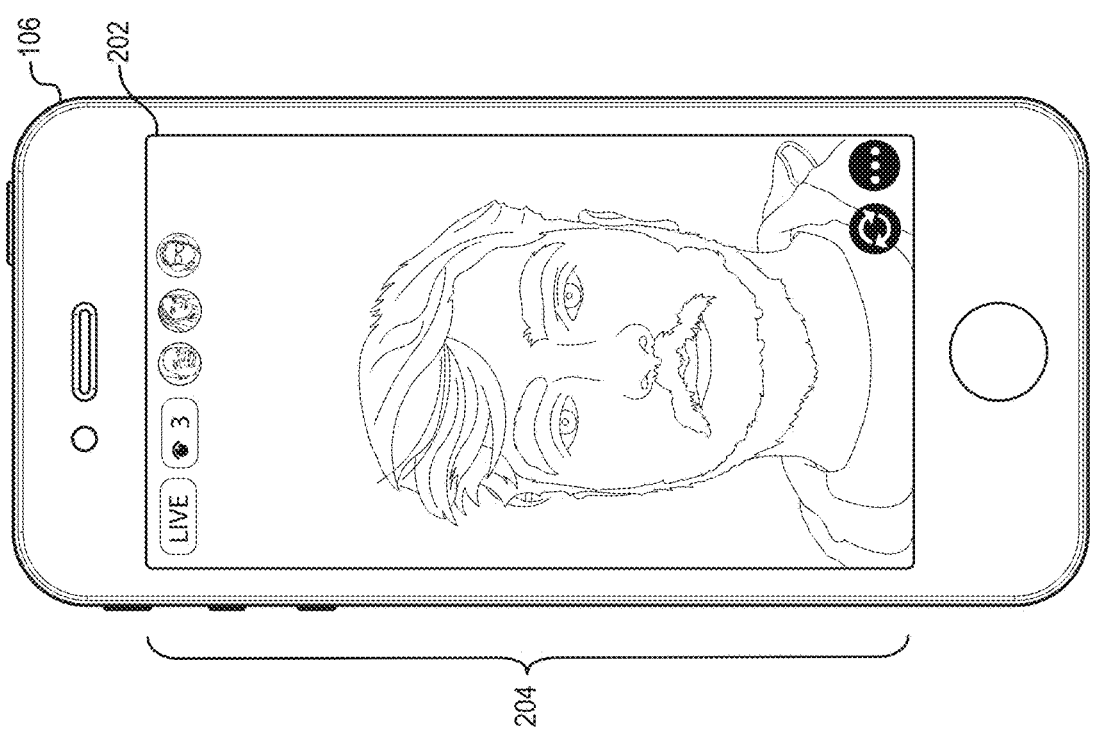

In response to detecting the press-and-hold touch gesture, the broadcast management system 100 replaces the live indicator 210, the audience indicator 220, and the viewer indicators 222a-222c with the highlight duration indicator 234, as shown in FIG. 3B. In one or more embodiments, the duration of a highlighted portion equals the length of time during which the broadcaster performs the press-and-hold touch gesture in connection with the touch screen display 202. Then in response to a detected end of the user interaction with the touch screen display 202 (e.g., a release of the press-and-hold touch gesture), the broadcast management system 100 ends the duration of the highlighted portion of the broadcast.

It is noted that in at least one embodiment, the broadcast management system 100 provides real-time indications of highlighted portions of a live video broadcast to one or more viewers of the broadcast. For example, in response to detecting the press-and-hold touch gesture, the broadcast management system 100 provides a display element on a display of one or more of the viewer devices 108a-108c indicating the occurrence of the highlighted portion. Additionally, the broadcast management system 100 can provide other indications of a highlighted portion in real-time to a viewer device, such as a vibration, a sound, a pop-up window, and so forth.

In at least one embodiment, the broadcast management system 100 only allows for highlighted portions of a maximum length (e.g., 10 seconds, 15 seconds, etc.). In that embodiment, in order to provide a countdown of remaining time in a given highlighted portion, the highlight duration indicator 234 includes a stopwatch ring around the exterior of the highlight duration indicator 234 that counts down the remaining time in the current highlighted portion that the broadcaster is capturing. In one or more embodiments, when the maximum length of the highlighted portion is reached, the broadcast management system 100 ends the highlighted portion regardless of whether the broadcaster has released the press-and-hold touch gesture.

In another embodiment, the broadcast management system 100 allows for highlighted portions of any length. In that embodiment, the duration of a highlighted portion simply equals the duration of the broadcaster's user interaction with the touch screen display 202. If the broadcast management system 100 allows for highlighted portions of any length, the stopwatch ring included in the highlight duration indicator 234 may simply complete every 10 seconds (or 30 seconds, 60 seconds, etc.) in order to provide the broadcaster with an indication as to how long the highlighted portion is so far.

In yet another embodiment, the broadcast management system 100 may allow for highlighted portions of variable length depending on factors associated with the detected user interaction. For example, in response to a press-and-hold touch gesture with heavy pressure, the broadcast management system 100 may allow for a highlighted portion with a longer maximum length (e.g., 30 seconds). Then, in response to a press-and-hold touch gesture with light pressure, the broadcast management system may allow for a highlighted portion with a shorter maximum length (e.g., 10 seconds). Thus, by utilizing different amounts of pressure of the touch screen display 202, the broadcaster can indicate highlighted portions of different lengths.

Figure 3D:
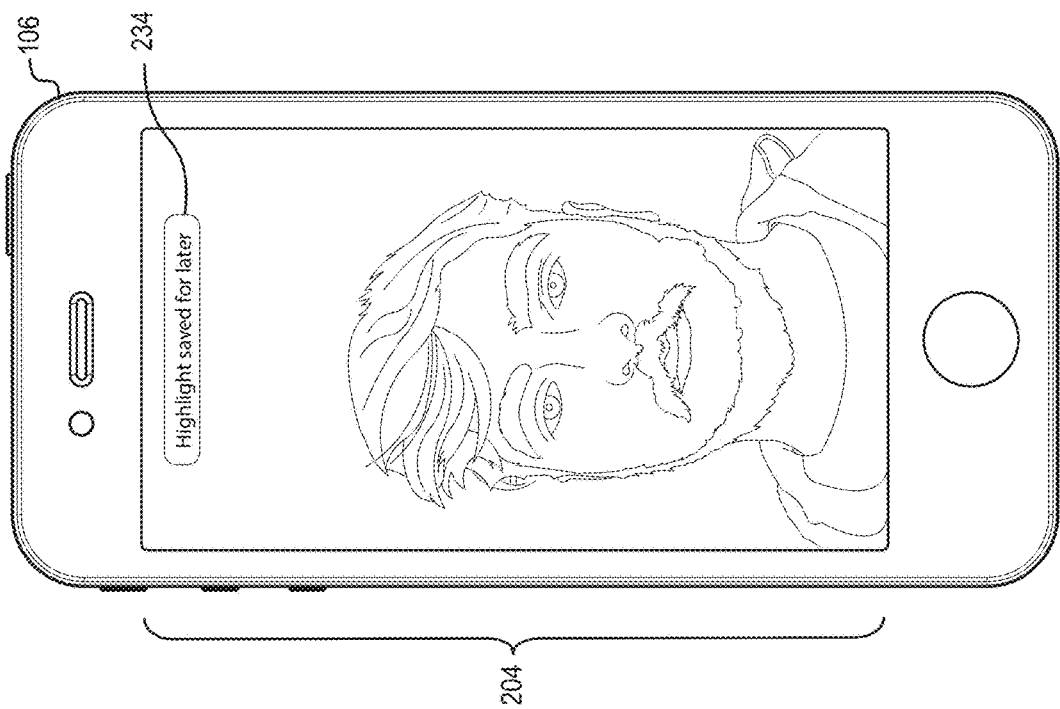
Figure 3C:
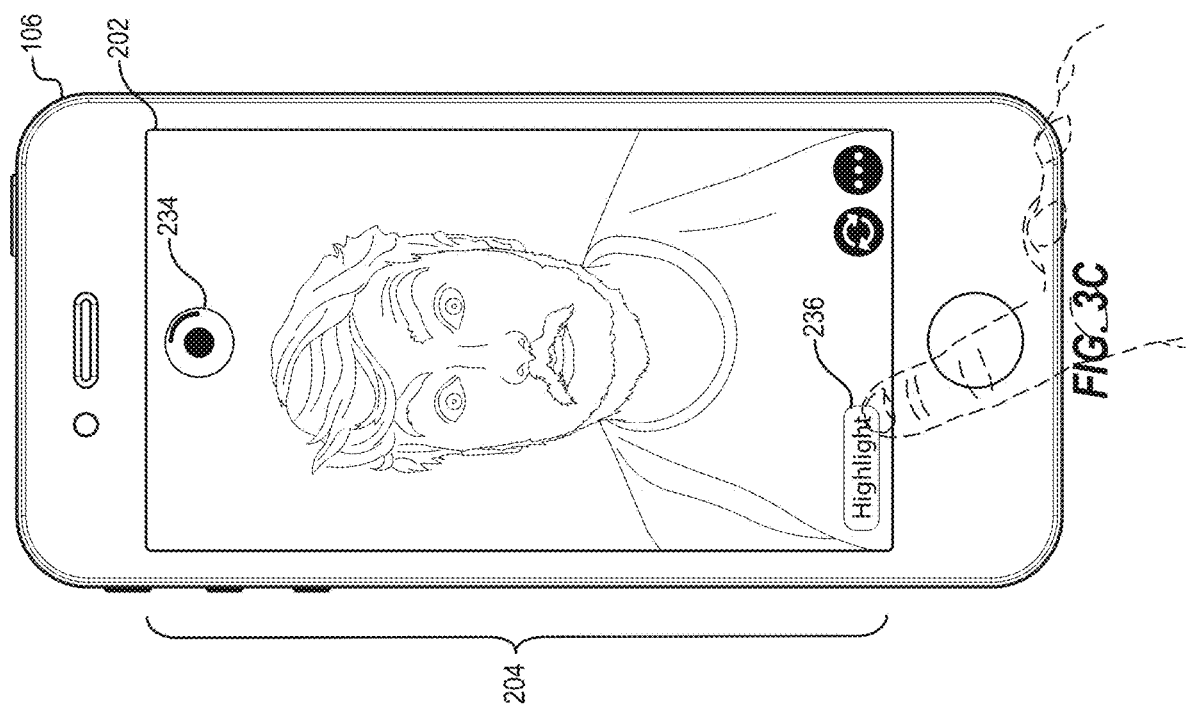

Rather than detecting a user interaction anywhere on the touch screen display 202, an alternative embodiment of the live video broadcast GUI 204 includes a highlight button. For example, as shown in FIG. 3C, the live video broadcast GUI 204 includes the highlight button 236. In this embodiment, the broadcaster indicates highlighted portions of the live video broadcast by interacting (e.g., pressing and holding) with the highlight button 236. The broadcast management system 100 can detect duration and pressure of interactions with the highlight button 236 in the same manner as described above. In at least one embodiment, the broadcast management system 100 includes the highlight button 236 to avoid accidental highlight indications that may occur when the broadcaster unintentionally touches the touch screen display 202.

In response to detecting an end of the user interaction (whether with an area of the touch screen display as described with reference to FIG. 3B, or with the highlight button 236 as described with reference to FIG. 3C), the broadcast management system 100 provides a notification to the broadcaster that the highlighted portion as successfully been indicated. For example, as shown in FIG. 3D, the broadcast management system 100 provides the highlight notification 238. In other embodiments, if there is a problem with the highlight, the highlight notification 238 includes a different message (e.g., "There was a problem saving the highlight"). In one or more embodiments, the broadcaster can indicate any number of highlights in a given live video broadcast. Alternatively, the broadcast management system 100 may only allow for a maximum number of highlighted portions in a live video broadcast.

In at least one embodiment, and in response to detecting a user interaction with the touch screen display 202 in any of the ways described above thereby indicating the beginning of a highlighted portion of a live video broadcast, the broadcast management system 100 records a starting highlight timestamp relative to the live video broadcast. Then, when the broadcaster ends the user interaction, the broadcast management system 100 records an ending highlight timestamp relative to the live video broadcast. Later, after the live video broadcast ends, the broadcast management system 100 determines the highlighted portions of the now-recorded video broadcast by extracting portions of the broadcast delineated by the recorded starting and ending highlight timestamps. Additionally, in at least one embodiment, the broadcast management system 100 stores the starting and ending highlight timestamps as metadata associated with the recording of the video broadcast.

In one or more embodiments, in order to account for the fact that the broadcaster may not know a broadcast highlight is occurring until the highlight has already begun (e.g., something unexpected occurs and the broadcaster then decides it is a highlight), the broadcast management system 100 pads the starting and ending highlight timestamps. To illustrate, a live video broadcast may be unscripted and unrehearsed. In that case, the broadcaster may be directing the broadcasting device 106 at anything currently happening. Something noteworthy may be ongoing for several seconds before the broadcaster realizes that the occurrence is a broadcast highlight and begins the user interaction to indicate it as such. To account for those few seconds that occurred prior to the broadcaster beginning the user interaction, the broadcast management system 100 subtracts a threshold amount (e.g., 3 seconds, 5 seconds, etc.) from the starting highlight timestamp. Similarly, the broadcaster may accidentally end the user interaction too early, thereby missing the end of a broadcast highlight. To account for this situation, the broadcast management system 100 adds the same threshold amount to the ending highlight timestamp. Accordingly, the resulting highlighted portion may be a few seconds longer than what the broadcaster indicates with a detected user interaction.

Once the broadcaster ends the live video broadcast (e.g., by selecting a display element in the live video broadcast GUI 204, by utilizing a predetermining touch gesture, by manipulating the broadcasting device 106 with a tilt or shake, etc.), the broadcast management system 100 provides additional information to the broadcaster. For example, as shown in FIG. 3E, the broadcast management system 100 immediately provides the video broadcast summary GUI 240 on the touch screen display 202 of the broadcasting device 106. In one or more embodiments, the video broadcast summary GUI 240 includes information regarding the number and identities of the viewers of the now-ended live video broadcast. Additionally, as shown in FIG. 3E, the video broadcast summary GUI 240 also includes information regarding how the recorded of the video broadcast may be accessed.

As mentioned above, in one or more embodiments, the broadcast management system 100 enables any of the broadcaster's networking system friends to view the video broadcast while the video broadcast is live (e.g., the broadcaster is currently broadcasting). In at least one embodiment, the broadcast management system 100 records the live video broadcast and makes the recording available via the networking system 104 after the live video broadcast ends. For example, in one embodiment, the broadcast management system 100 makes the recording of the video broadcast (e.g., including indicated highlighted portions) available via the networking system 104 within the broadcaster's ephemeral content collection.

As discussed above, once the broadcast management system 100 adds the recording to the broadcaster's ephemeral content collection, the recording will only be available for viewing for a threshold amount of time. Once the threshold amount of time expires, the broadcast management system 100 removes the recording from the broadcaster's ephemeral content collection. At that point, the recording of the video broadcast is no longer available via the networking system 104. Thus, digital items added to a networking system user's ephemeral content collection expire unlike the networking system user's posts, comments, or any other networking system activity.

Also as discussed above, in at least one embodiment, the broadcast management system 100 enables the broadcaster to select various options as to how the recording of the video broadcast is included in the broadcaster's ephemeral content collection. For example, utilizing the processes described above, the broadcaster may have indicated one or more highlighted portions of the video broadcast while the video broadcast was live. Accordingly, the broadcast management system 100 provides the broadcaster with options regarding sharing the one or more highlighted portions.

Figure 3F:
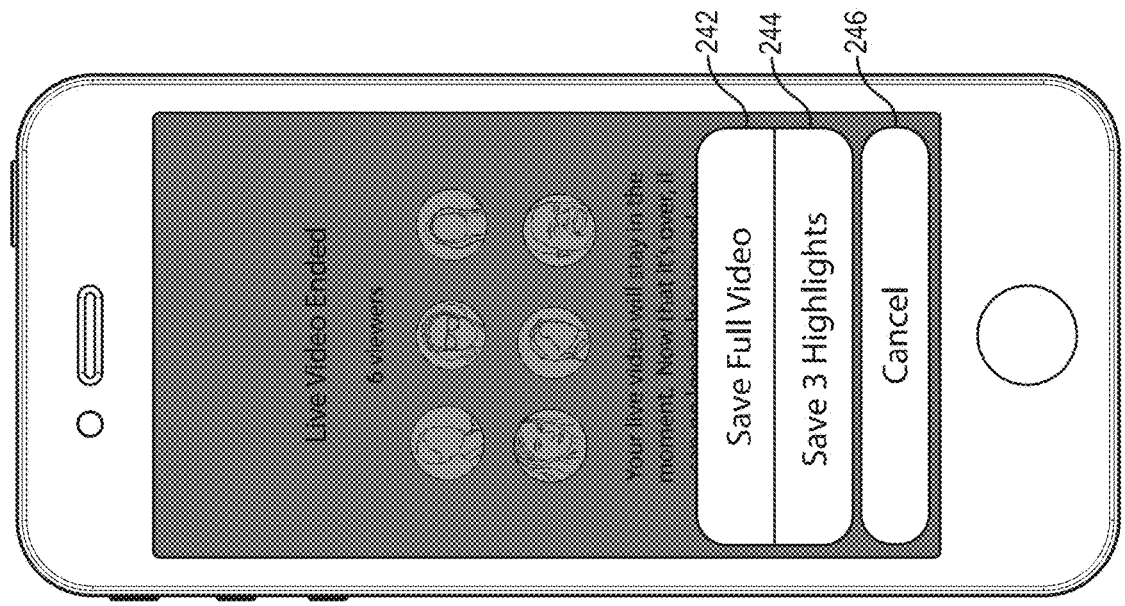
Figure 3E:
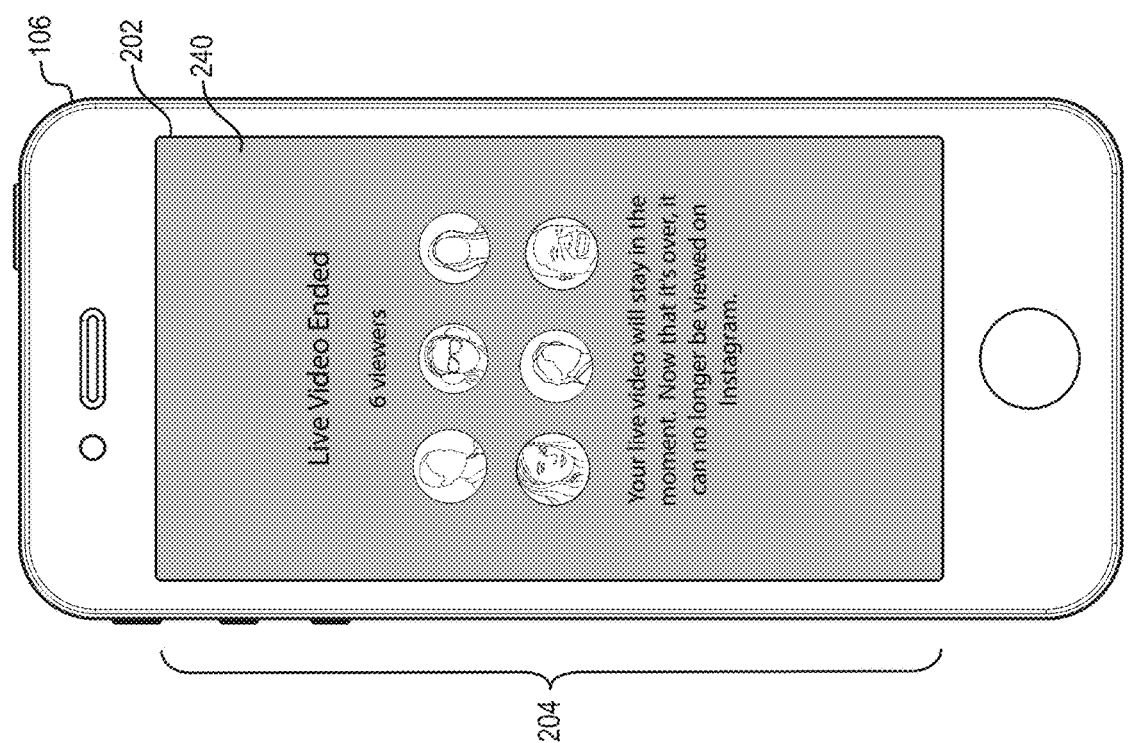

For instance, as shown in FIG. 3F, in response to determining the broadcaster indicated three video highlights during the live video broadcast, the broadcast management system 100 provides the save full video button 242, the save highlights button 244, and the cancel button 246. In response to a detected selection of the save full video button 242, the broadcast management system 100 adds the recording of the video broadcast in its entirety to the broadcaster's ephemeral content collection. Thus, in at least one embodiment, networking system users who view the broadcaster's ephemeral content collection for the next twenty-four hours can view the full recording of the video broadcast as part of the broadcaster's ephemeral content collection. In that case, as will be described further below, the broadcast management system 100 also adds indications of the highlighted portions within the recording of the video broadcast such that a viewer of the recording can tell where a highlighted portion begins and ends.

In response to a detected selection of the save highlights button 244, the broadcast management system 100 may only add the indicated highlighted portions of the video broadcast to the broadcaster's ephemeral content collection. For example, in this case, the broadcast management system 100 treats each highlighted portion of the now-recorded video broadcast as an individual video recording. As mentioned above, in one or more embodiments and for each highlighted portion, the broadcast management system 100 creates metadata including a starting highlight timestamp and an ending highlight timestamp. Accordingly, in order to add a single highlight from a recorded video broadcast to the broadcaster's ephemeral content collection, the broadcast management system 100 may simply extract the video data from the recording of the video broadcast in-between the starting and ending highlight timestamps (e.g., creating a video clip including the highlighted portion).

When added to the broadcaster's ephemeral content collection, the broadcast management system 100 automatically plays each highlighted portion as its own digital video. In at least one embodiment and as will be discussed further below, the broadcast management system 100 adds a selectable option to the display of each highlighted portion that enables the viewer to continue to watch the full recording of the video broadcast once at the end of the highlighted portion. In one or more embodiments, in response to a detected selection of the cancel button 246, the broadcast management system 100 deletes the recording of the video broadcast and exits from the video broadcast summary GUI 240. This option is appropriate when the broadcaster meant for the live video broadcast to only be experience in real-time, and not as a recording. Alternatively, in response to the detected selection of the cancel button 246, the broadcast management system 100 may save the recording of the video broadcast to the broadcaster's networking system profile, but not make the recording (e.g., full or any portion) available via the broadcaster's ephemeral content collection.

Figure 3H:
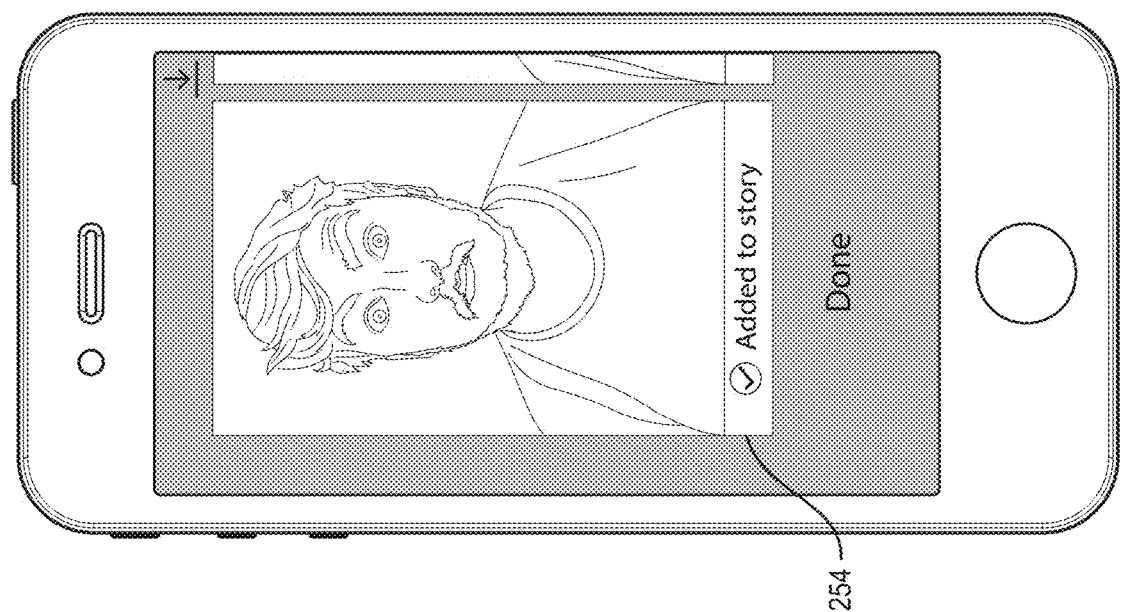
Figure 3G:
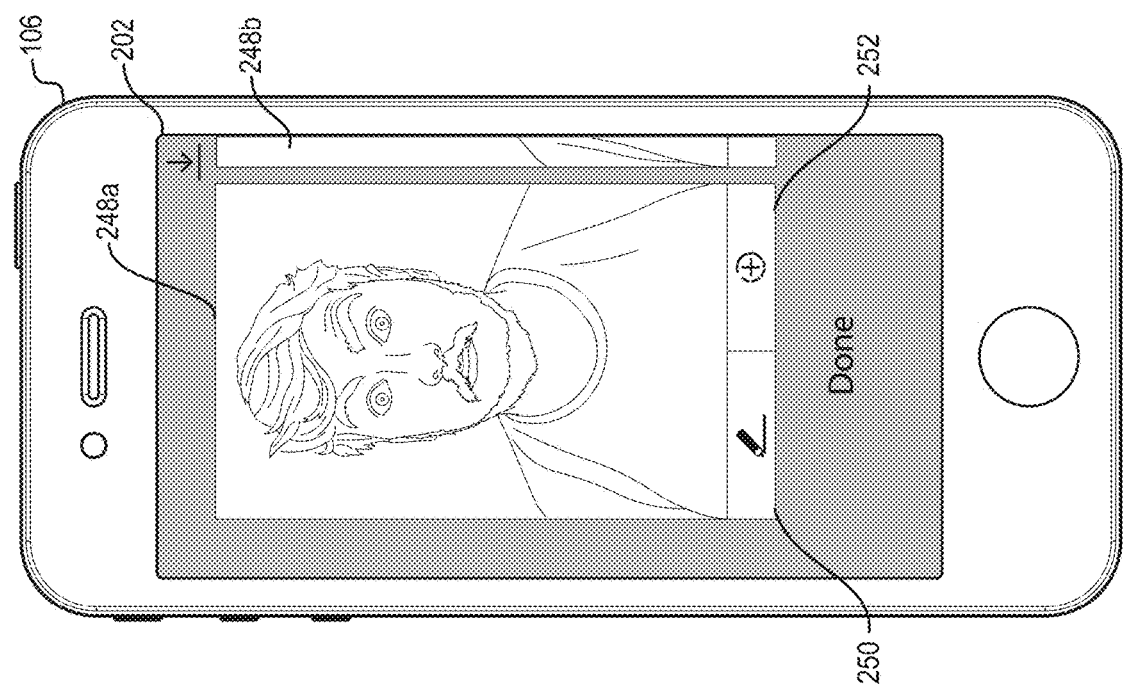

In one or more embodiments, the broadcast management system 100 enables the broadcaster to review, edit, and add a subset of the highlighted portions of the video broadcast to the broadcaster's ephemeral content collection. For example, as shown in FIG. 3G, in response to a detected user interaction with the video broadcast summary GUI 240 (e.g., a swipe-left touch gesture), the broadcast management system provides a highlight review display (e.g., the highlight review display 248a, 248b) for each highlighted portion indicated by the broadcaster during the live video broadcast. In at least one embodiment, the broadcaster can swipe through the collection of highlight review displays by continuing to swipe-left in connection with the touch screen display 202 of the broadcasting device 106. Furthermore, in at least one embodiment, the broadcast management system 100 automatically plays the highlighted portion represented in the highlight review display that has current focus on the touch screen display 202 (e.g., the highlighted portion represented in the highlight review display 248a, as shown in FIG. 3G).

In some embodiments, the broadcast management system 100 enables the broadcaster to edit highlighted portions in response to a detected selection of the edit button 250, as shown in FIG. 3G. For example, in response to the broadcaster selecting the edit button 250 in connection with the highlight review display 248a, the broadcast management system 100 enables the broadcaster to add to or remove segments from the highlighted portion associated with the highlight review display 248a. Additionally or alternatively, in response to the broadcaster selecting the edit button 250, the broadcast management system 100 can enable the broadcaster to add a filter to the associated highlighted portion, to edit metadata connected with the associated highlighted portion, to compose a networking system post in connection with the highlighted portion, to add one or more networking system tags in connection with the highlighted portion, to layer a music track on the highlighted portion, to add a doodle or drawing to the highlighted portion, to configure privacy settings connected with the highlighted portion, and so forth.

In response to a detected selection of the add button 252 as shown in FIG. 3G, the broadcast management system 100 adds the highlighted portion associated with the highlight review display 248a (e.g., including any edits made by the broadcaster) to the broadcaster's ephemeral content collection. At this point, in one or more embodiments, the broadcast management system 100 begins counting down the threshold period of time during which the added highlighted portion is available via the broadcaster's ephemeral content collection. In response to the broadcast management system 100 successfully adding the highlighted portion to the broadcaster's ephemeral content collection, the broadcast management system 100 provides the notification 254 in connection with the highlight review display 248a, as shown in FIG. 3H.

Figure 4B:
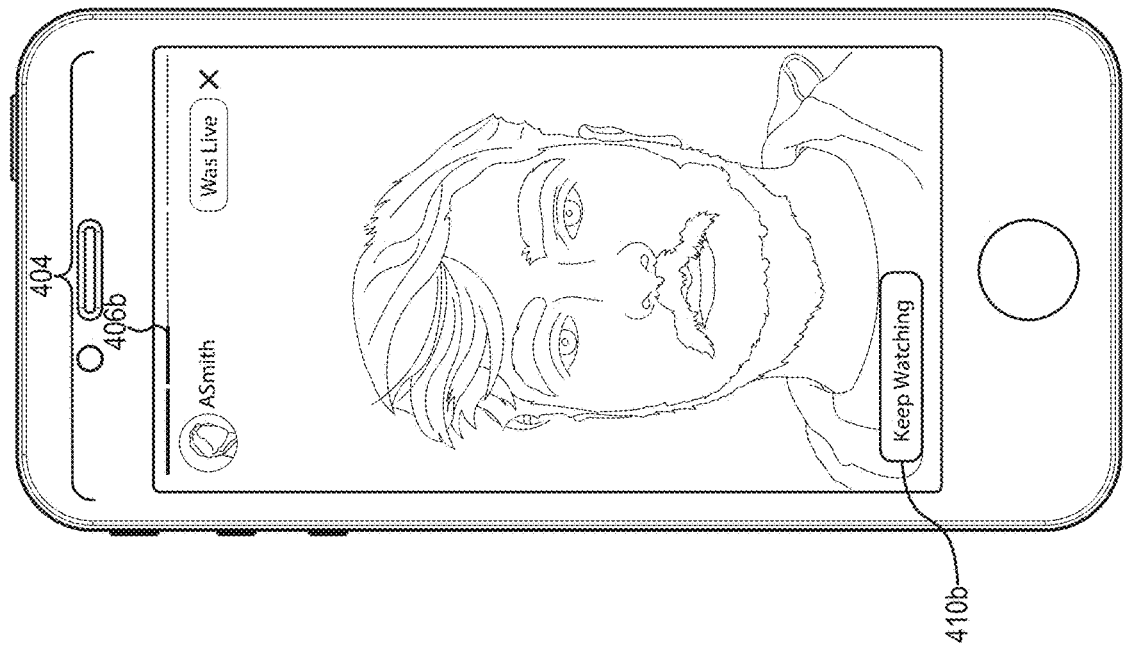
FIGS. 4A-4E illustrate a series of graphical user interfaces illustrating various features of one embodiment of the broadcast management system.
Figure 4A:
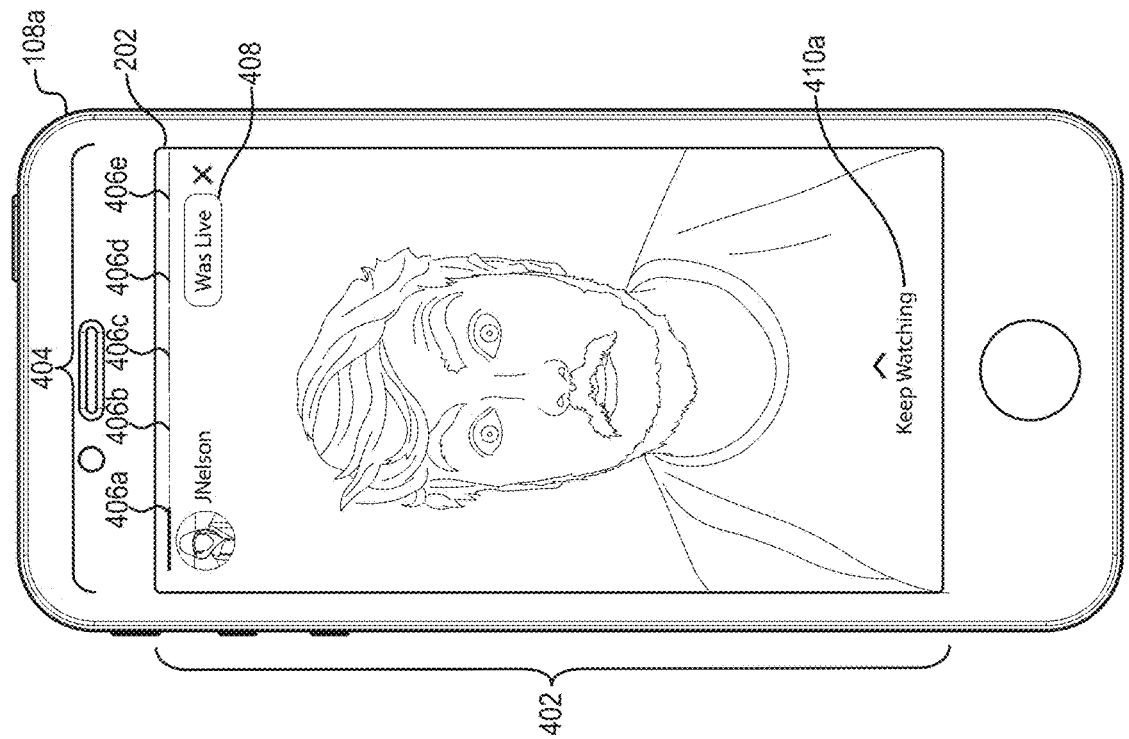

As discussed above, the broadcast management system 100 provides a broadcaster's selected broadcast highlights to additional networking system users via the broadcaster's ephemeral content collection. For example, in response to a viewer selecting the broadcaster's ephemeral content collection via the networking system 104, the broadcast management system 100 provides the broadcaster's ephemeral content collection in the ephemeral content collection GUI 402 on the touch screen display 202 of the viewer device 108a, as shown in FIG. 4A. In one or more embodiments, the ephemeral content collection GUI 402 includes a display of an ephemeral content collection associated with a networking system friend of the viewer (e.g., the user of the viewer device 108a).

As mentioned above, a networking system user may add any number of digital media items (e.g., digital photographs, digital video recordings, etc.) to his or her ephemeral content collection. In one or more embodiments, the broadcast management system 100 removes each digital media item from the user's ephemeral content collection upon the expiration of a threshold amount of time during which the digital media item may be displayed (e.g., twenty-four hours). Accordingly, when a viewer accesses the broadcaster's ephemeral content collection, as shown in FIG. 4A, the broadcast management system 100 provides the ephemeral content collection timeline 404 as part of the ephemeral content collection GUI 402.

In at least one embodiment, the ephemeral content collection timeline 404 includes multiple collection segments 406a-406e. For example, each collection segment 406a-406e in the ephemeral content collection timeline 404 corresponds to a digital media item added to the displayed ephemeral content collection by the broadcaster. In other words, each collection segment 406a-406e corresponds to a digital photograph or a digital video (e.g., a recording of a video broadcast, a video clip including a highlighted portion of a video broadcast, etc.).

In one or more embodiments, the broadcast management system 100 automatically displays each digital media item within the displayed ephemeral content collection in sequence as soon as the viewer accesses the channel. For example, in one embodiment, the broadcast management system 100 will display the newest digital media item in the broadcaster's ephemeral content collection as soon as the viewer accesses the broadcaster's ephemeral content collection, and then will display the next newest digital media item and so forth. In other embodiments, the broadcast management system 100 may display the digital media items in the broadcaster's ephemeral content collection such that the oldest digital media items are displayed first. In yet another embodiment, the broadcast management system 100 may randomize the order in which digital media items are displayed in the broadcaster's ephemeral content collection.

In at least one embodiment, the broadcast management system 100 will display each included digital media item for a predetermined amount of time (e.g., 5 seconds) before displaying the next digital media item. If the displayed digital media item is a digital video, the broadcast management system 100 may display the digital video for its full duration rather than for the predetermine amount of time. In at least one embodiment, the predetermined amount of time may be configured by the owner of the ephemeral content collection (e.g., the broadcaster).

Furthermore, as the broadcast management system 100 displays each digital media item in the broadcaster's ephemeral content collection, the broadcast management system 100 highlights the collection segment associated with the digital media item currently on display (e.g., the collection segment 406a in FIG. 4A is highlighted indicating it is associated with the digital photograph currently displayed in the ephemeral content collection GUI 402). When the broadcast management system 100 has displayed the digital media item associated with the collection segment 406a for the threshold amount of time, the broadcast management system 100 displays the next newest digital media item in the broadcaster's ephemeral content collection for the threshold amount of time (or for the duration of the digital video if the next newest digital media item is a digital video), and highlights the associated collection segment (e.g., the collection segment 406b in the ephemeral content collection timeline 404 as shown in FIG. 4B). Thus, the viewer can easily see how many digital media items are included in the broadcaster's ephemeral content collection, and how many more digital media items are left to view. In an additional or alternative embodiment, rather than highlighting the entire collection segment corresponding to a currently displayed digital media item, the broadcast management system 100 progressively highlights the collection segment so as to indicate an amount of time remaining for display of the current digital media item. In that case, the viewer has a better understanding of how much display time remains for a particular digital media item.

As discussed above, the broadcaster can share one or more highlighted portions of a recorded video broadcast via the broadcaster's ephemeral content collection. For example, as shown in FIG. 4A, the broadcast management system 100 automatically plays the highlighted portion added by the broadcaster (e.g., as described with references to FIGS. 3G and 3H) as a video clip within the ephemeral content collection GUI 402. In one or more embodiments, in order to indicate to the viewer that the video clip is associated with a formerly-live video broadcast, the broadcast management system 100 includes the was live indicator 408.

Also as discussed above, in one or more embodiments, the broadcast management system 100 provides an option in connection with a highlighted portion for a viewer to watch the full video broadcast from which the highlighted portion originates. For example, as shown in FIG. 4A, the broadcast management system 100 provides the keep watching selector 410a in connection with the highlighted portion of a video broadcast displayed in the ephemeral content collection GUI 402. In response to a detected selection of the keep watching selector 410a (e.g., a swipe-up touch gesture), the broadcast management system 100 automatically begins playing the recording of the video broadcast from which the highlighted portion came.

In one embodiment, the broadcast management system 100 automatically begins playing the recording from the ending timestamp of the highlighted portion in response to the detected selection of the keep watching selector 410a. Alternatively, the broadcast management system 100 can automatically begin playback from the beginning of the recording of the video broadcast in response to the detected selection of the keep watching selector 410a. As shown in FIG. 4A, the keep watching selector 410a is a display element that responds to a swipe-up touch gesture. In other embodiments, as shown in FIG. 4B, the keep watching selector 410b is a different type of display element, such as a button that responds to a tap touch gesture.

In yet another embodiment, the broadcast management system 100 includes the full recording of a video broadcast as part of the broadcaster's ephemeral content collection. For example, as shown in FIG. 4C, the digital media item associated with the collection segment 406c is a full recording of a video broadcast (e.g., indicated by the was live indicator 408 and the absence of a keep watching selector). As illustrated in FIG. 4C, the broadcast management system 100 has progressively highlighted the collection segment 406c to indicate the viewer has watched approximately one third of the recording.

As discussed above, a broadcaster can indicate a highlighted portion of a video broadcast at any point during the video broadcast. Accordingly, if a viewer is watching a recording of the video broadcast via the ephemeral content collection GUI 402, as shown in FIG. 4C, the broadcast management system 100 indicates that a highlighted portion is occurring during playback of the recording of the video broadcast in a number of ways. For example, when playback of the recording of the video broadcast reaches a starting highlight timestamp (e.g., indicated by the recording's associated metadata, as described above), the broadcast management system 100 adds a display element to the ephemeral content collection GUI 402 (e.g., a star icon, etc.). Alternatively, when playback of the recording of the video broadcast reaches a starting highlight timestamp, the broadcast management system 100 adds a border to the ephemeral content collection GUI 402, or alters the ephemeral content collection GUI 402 in another way. Then, when playback of the recording reaches an ending highlight timestamp, the broadcast management system 100 can simply remove the added display element from the ephemeral content collection GUI 402, signaling to the viewer that the highlighted portion has ended.

In one or more embodiments, the viewer may only be interested in viewing the highlighted portions of the recording of the video broadcast. In that case, the broadcast management system 100 provides functionality that enables the viewer to scrub (e.g., "fast-forward," "rewind") through the recording of the video broadcast. For example, as shown in FIG. 4C, in response to a detected user interaction (e.g., a press-and-hold touch gesture) with the ephemeral content collection GUI 402, the broadcast management system 100 changes a playback mode associated with the playback of the recording of the video broadcast from a simple playback mode to a scrub playback mode.

Figure 4D:
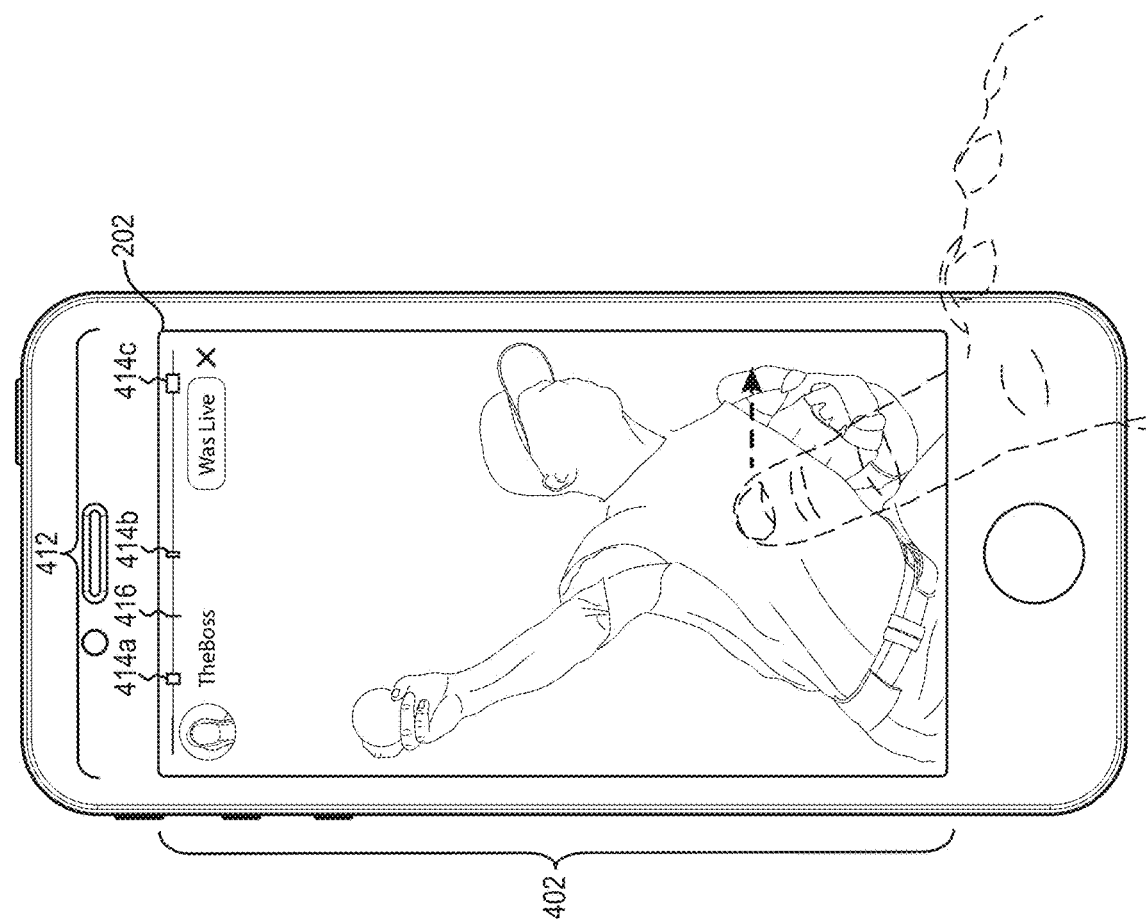
Figure 4C:
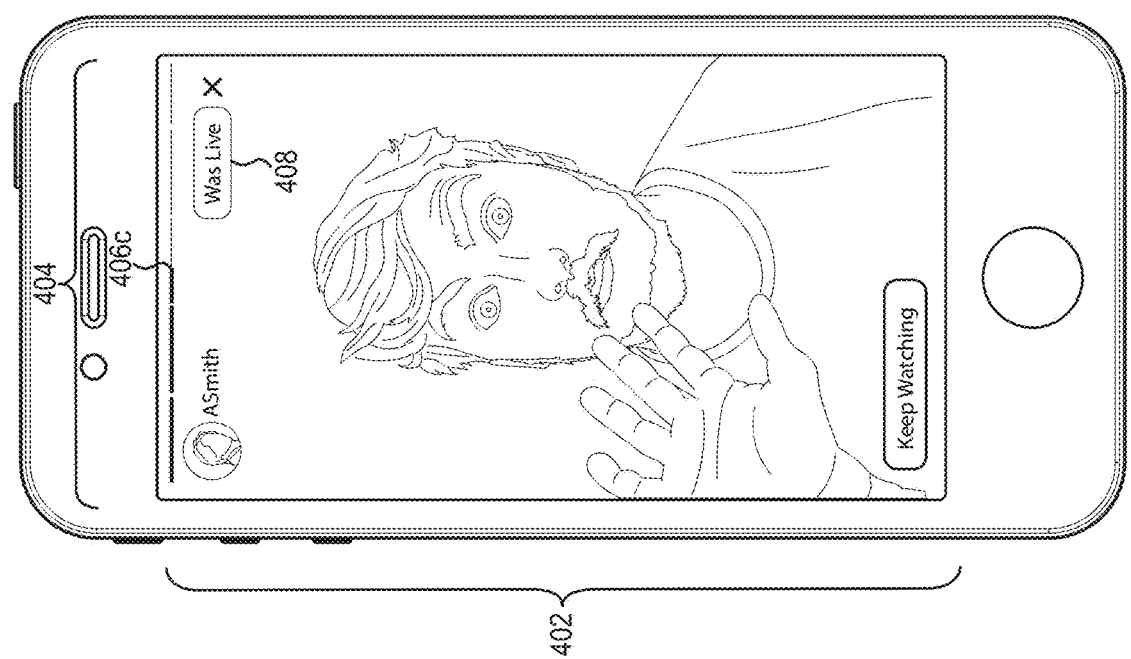
Figure 4E:
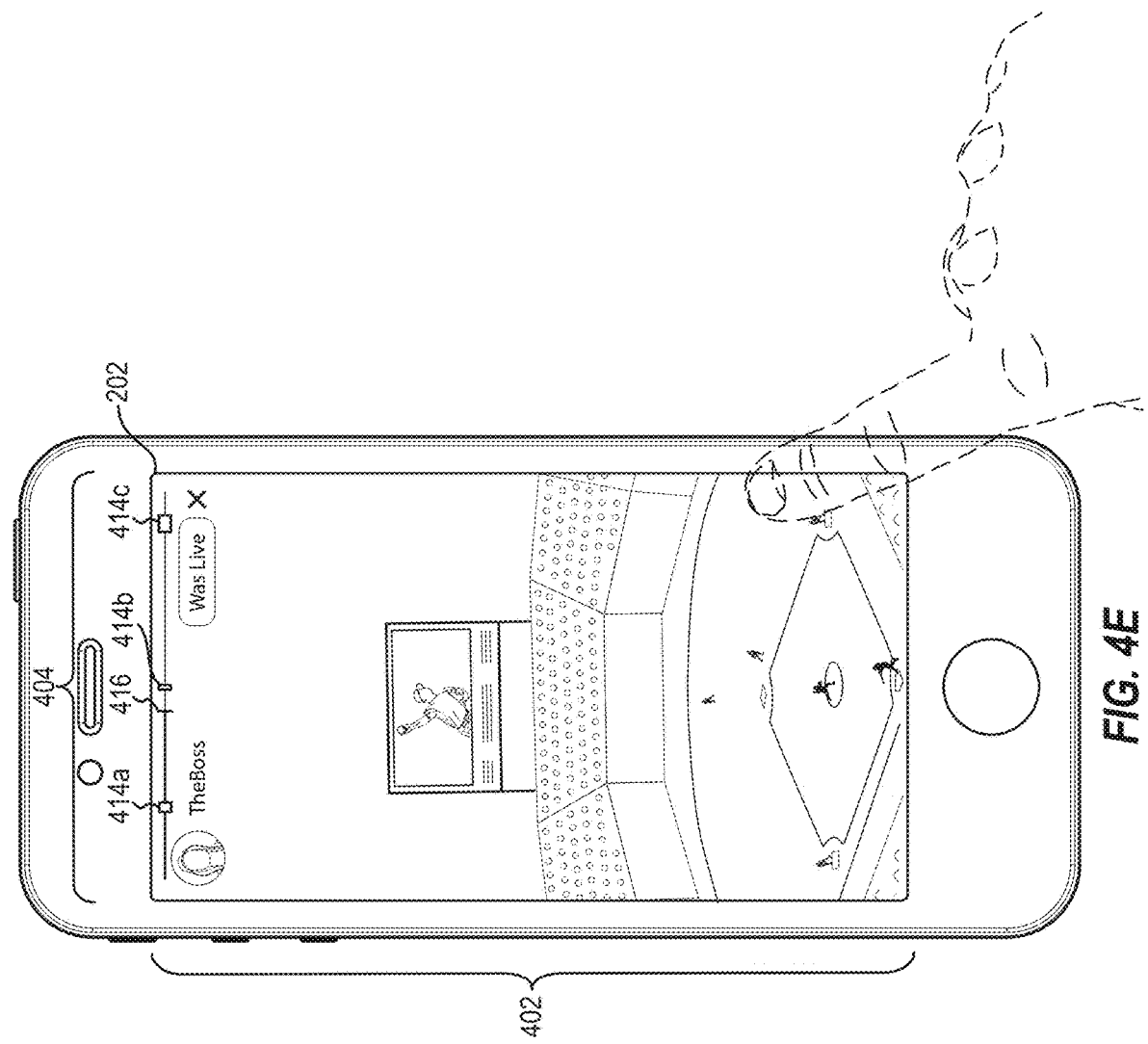

To illustrate the scrub playback mode, in response to a detected user interaction with the ephemeral content collection GUI 402, as shown in FIG. 4C, the broadcast management system 100 enters the recording of the video broadcast into scrub playback mode, as shown in FIG. 4D. In scrub playback mode, the broadcast management system 100 replaces the ephemeral content collection timeline 404, as shown in FIG. 4C, with the video broadcast recording timeline 412, as shown in FIG. 4D. In one or more embodiments, the video broadcast recording timeline 412 is effectively an expansion of the collection segment 406c, shown in FIG. 4C. Indeed, as shown in FIG. 4D, the playback progress (e.g., illustrated by the playback indicator 416) matches the highlight progress through the collection segment 406c.

In at least one embodiment, the broadcast management system 100 maintains scrub playback mode for as long as the user interaction is maintained (e.g., for as long as the viewer maintains the press-and-hold touch gesture). When the user interaction ends, the broadcast management system 100 transitions the display back to simple playback mode. Alternatively, following the user interaction that initiates scrub playback mode, the broadcast management system 100 may maintain scrub playback mode until another user interaction is detected (e.g., another press-and-hold touch gesture).

In at least one embodiment, the broadcast management system 100 indicates the occurrence and duration of one or more highlighted portions of the recorded video broadcast in the video broadcast recording timeline 412. For example, as shown in FIG. 4D, the broadcast management system 100 includes the highlighted portion indicators 414a-414c in the video broadcast recording timeline 412 to indicate where the highlighted portions are in the recording and how long each highlighted portion lasts (e.g., the length of the highlighted portion indicator corresponds with the length of the highlighted portion).

In order to scrub the playback of the recording, the broadcast management system 100 detects user interactions in connection with the ephemeral content collection GUI 402. For example, as shown in FIG. 4D, in response to a detected horizontal swipe touch gesture, the broadcast management system 100 may scrub the playback of the recording in the same direction as the detected gesture. For instance, in response to a detected right-swipe touch gesture, as shown in FIG. 4D, the broadcast management system 100 scrubs the playback forward (e.g., "fast-forward), as indicated by the playback indicator 416 in FIG. 4E. In this way, the viewer can scrub directly to the highlighted portions of the recording of the video broadcast.

Figure 5:
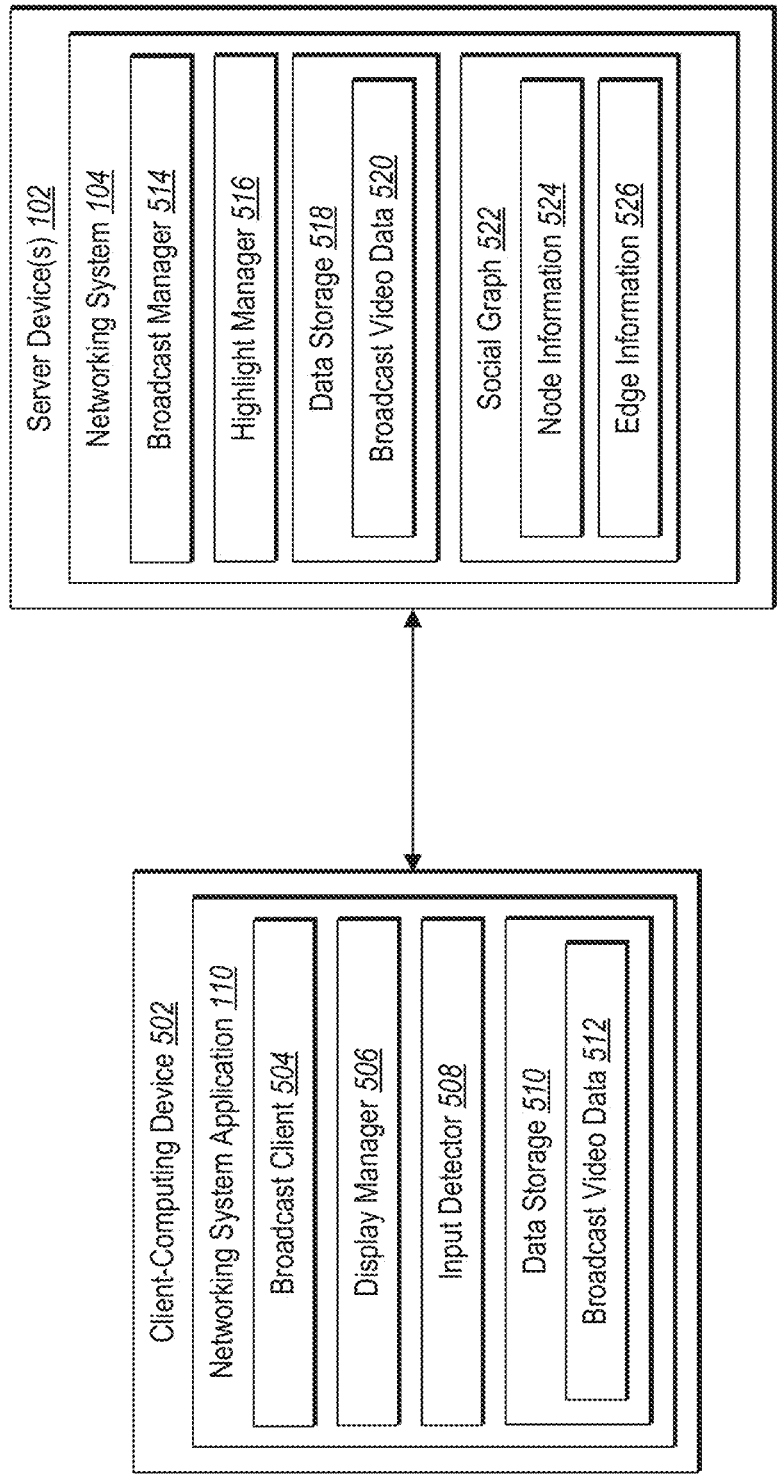
FIG. 5 illustrates a detailed schematic diagram of the broadcast management system in accordance with one or more embodiments.

As discussed above, the systems and methods laid out with reference to FIGS. 1-4E enable a broadcaster to indicate and share highlighted portions of a live video broadcast. FIG. 5 illustrates a schematic diagram illustrating another example embodiment of the broadcast management system 100. As shown in FIG. 5, the broadcast management system 100 includes, but is not limited to, the client-computing device 502 including the networking system application 110, and the server device 102 hosting the networking system 104.

In one or more embodiments, the client-computing device 502 is any of the broadcasting device 106, the viewer device 108a, the viewer device 108b, or the viewer device 108c. For example, as mentioned above, the broadcasting device 106 and the viewer devices 108a-108c may be the same type of computing device (e.g., a mobile computing device such as a smart phone). Furthermore, in at least one embodiment, the networking system application 110 includes the same functionality regardless of the type of computing device upon which the networking system application 110 is installed. In other words, the networking system application 110 includes the functionality that allows the user of the client-computing device 502 to both broadcast live video and to view live video broadcasts.

As shown in FIG. 5, the networking system application 110 includes a broadcast client 504, a display manager 506, an input detector 508, and a data storage 510 including broadcast video data 512. Also shown in FIG. 5, the networking system 104 includes a broadcast manager 514, a highlight manager 516, and a data storage 518 including recorded broadcast video data 520.

In at least one embodiment, the broadcast management system 100 accesses the networking system 104 in order to identify and analyze networking system user data. Accordingly, the networking system 104 includes a social graph 522 for representing a plurality of users, actions, and concepts. In one or more embodiments, the social graph 522 includes node information 524 and edge information 546. Node information 524 of the social graph 522 stores information including, for example, nodes for users and nodes for repositories. Edge information 526 of the social graph 522 stores information including relationships between nodes and/or actions occurring within the networking system 104. Further details regarding the networking system 104, the social graph 522, edges, and nodes are presented below with respect to FIG. 11.

Each of the components 504-526 can be implemented using a computing device including at least one processor executing instructions that cause the broadcast management system 100 to perform the processes described herein. In some embodiments, the networking system components described herein can be implemented by the server device 102, or across multiple server devices. Additionally or alternatively, a combination of one or more server devices and one or more mobile computing devices can implement the components of the networking system 104 and/or the networking system application 110. Additionally or alternatively, the components described herein can comprise a combination of computer-executable instructions and hardware.

In one or more embodiments, the networking system application 110 is a native application installed on the client-computing device 502. For example, the networking system application 110 can be a mobile application that installs and runs on a mobile device, such as a smart phone or a tablet computer. Alternatively, the networking system application 110 can be a desktop application, widget, or other form of a native computer program. Furthermore, the networking system application 110 may be a remote application accessed by the client-computing device 502. For example, the networking system application 110 may be a web application that is executed within a web browser of the client-computing device 502.

As mentioned above, and as shown in FIG. 5, the networking system application 110 includes the broadcast client 504. In one or more embodiments, the broadcast client 504 handles all activities related to streaming a live video broadcast from the client-computing device 502. For example, in at least one embodiment, the broadcast client 504 streams or transmits a camera feed from the client-computing device 502 to the networking system 104. As discussed above, in response to a detected initiation of a live video broadcast by the user of the client-computing device 502 (e.g., the broadcaster), the broadcast client 504 accesses the camera feed (e.g., a feed of image frames captured by an active camera associated with the client-computing device 502), and transmits the camera feed to the networking system 104 in real-time.

Additionally, the broadcast client 504 detects and transmits interaction information associated with selected highlighted portions of a live video broadcast. As discussed above, the broadcaster (e.g., the user of the client-computing device 502) can interact with a display of the client-computing device 502 during a live video broadcast in order to indicate that a highlight (e.g., something of note in the broadcast) is occurring. Accordingly, the broadcast client 504 determines whether a user interaction indicates that a highlighted portion of the live video broadcast is occurring (e.g., by determining the type of user interaction), and records a starting highlight timestamp and an ending highlight timestamp for each determined highlighted portion. In at least one embodiment, the broadcast client 504 provides the highlight timestamp information to the networking system 104.

Furthermore, the broadcast client 504 receives networking system activity associated with a currently-live video broadcast. For example, in one or more embodiments, viewers of a live video broadcast can engage in networking system activities (e.g., comments, shares, likes, etc.) related to the live video broadcast. In order to enable the broadcaster and one or more viewers to have a more immersive live experience, the networking system 104 provides information associated with the networking system activities to the broadcast client 504 in real-time. In at least one embodiment, the broadcast client 504 displays the received information as part of an interface (e.g., the live video broadcast GUI 204 as shown in FIG. 2E) for the user of the client-computing device 502.

As mentioned above, the networking system application 110 can also be utilized by one or more viewers of a live video broadcast. Thus, in one or more embodiments, the broadcast client 504 detects information associated with the viewing of a live video broadcast. For example, the broadcast client 504 detects viewer information such as viewer duration (e.g., when the viewer tunes in to watch a live video broadcast, when the viewer stops watching the live video broadcast), and networking system activity information (e.g., comments submitted by a viewer during a live video broadcast, etc.).

As mentioned above, and as shown in FIG. 5, the networking system application 110 includes a display manager 506. The display manager 506 provides, manages, and/or controls a graphical user interface ("GUI") that allows the user of the client-computing device 502 to interact with features of the broadcast management system 100. For example, in one or more embodiments, the display manager 506 facilitates the display of a GUI. For instance, the display manager 506 may compose the GUI of a plurality of graphical components, objects, and/or elements that allow a user to engage in networking system activities (e.g., broadcasting a live video, viewing a live video broadcast, commenting on a live video broadcast, sharing a live video broadcast, etc.).

More particularly, the display manager 506 may direct the client-computing device 502 to display a group of graphical components, objects, and/or elements that enable a user to interact with various features of the networking system 104. To illustrate, the display manager 506 provides a GUI that allows a networking system user to input one or more types of content into a networking system post or electronic message. As used herein, "content" refers to any data or information to be included as part of a networking system post or electronic message. For example, the term "content" will be used herein to generally describe text, images, digital media, files, location information, payment information, or any other data that can be included as part of a networking system post or electronic message.

The display manager 506 also facilitates the input of text or other data for the purpose of interacting with one or more features of the networking system 104. For example, the display manager 506 provides a user interface that includes a touch screen display keyboard. A user can interact with the touch screen display keyboard using one or more touch gestures to input text for inclusion in a networking system post or electronic message. For example, a user can use the touch screen display keyboard to compose a networking system comment related to a live video broadcast. In addition to text, the GUI including the touch screen display keyboard can facilitate the input of various other characters, symbols, icons, or other information.

Furthermore, the display manager 506 is capable of transitioning between two or more graphical user interfaces. For example, in one embodiment, the display manager 506 provides a networking system newsfeed to a networking system user containing one or more networking system posts associated with other networking system users. Later, in response to a detected selection by the user of a networking system post associated with a live video broadcast, the display manager 506 transitions to a second GUI (e.g., the live video broadcast GUI 204) that includes a display of the live video broadcast.

As further illustrated in FIG. 5, the networking system application 110 includes an input detector 508. In one or more embodiments, the input detector 508 detects, receives, and/or facilitates user input in any suitable manner. In some examples, the user input detectors 508 detects one or more user interactions with respect to a GUI. As referred to herein, a "user interaction" means a single interaction, or combination of interactions, received from a user by way of one or more input devices. For example, the input detector 508 detects a user interaction from a keyboard, mouse, touch screen display, and/or other input device. In the event the client-computing device 502 includes a touch screen display, the input detector 508 detects one or more touch gestures (e.g., swipe gestures, tap gestures, pinch gestures, reverse pinch gestures, etc.) from a user that forms a user interaction. In some examples, a user can provide the touch gestures in relation to and/or directed at one or more graphical objects or graphical elements of a GUI.

The input detector 508 may additionally, or alternatively, receive data representative of a user interaction. For example, the input detector 508 may receive one or more user configurable parameters form a user, one or more commands from the user, and/or any other suitable user input. The input detector 508 may receive input data from one or more components of the networking system 104, or from one or more remote locations.

The networking system application 110 performs one or more functions in response to the input detector 508 detecting user input and/or receiving other data. Generally, a user can control, navigate within, and otherwise use the networking system application 110 by providing one or more user inputs that the input detector 508 can detect. For example, in response to the input detector 508 detecting user input, one or more components of the networking system application 110 allow a networking system user to scroll through a newsfeed. In another example, in response to the input detector 508 detecting user input, one or more components of the networking system application 110 allow the user to interact with a live video broadcast display.

In at least one embodiment, the input detector 508 determines whether a detected user interaction is in connection with a live video broadcast display. For example, as described above, one or more features of the broadcast management system 100 provide a live video broadcast display, with which a viewer can interact using various touch gestures (e.g., by tapping on a comment button, by tapping on a like button, etc.). Accordingly, the input detector 508 can determine when, for example, a viewer's tap touch gesture is over a portion of a live video broadcast display. In response to determining that the touch gesture is over a portion of the live video broadcast display, the input detector 508 can report the touch gesture to the broadcast client 504, or other component.

As further shown in FIG. 5, and as mentioned above, the networking system application 110 includes the data storage 510. The data storage 510 includes broadcast video data 512. In one or more embodiments, the broadcast video data 512 is representative of broadcast video information, such as described herein.

Additionally, in one or more embodiments, the client-computing device 502 also includes camera and display features. For example, in one or more embodiments the client-computing device 502 includes at least one camera (e.g., a smart phone camera or tablet computer camera) and at least one display (e.g., a touch screen display). In one or more embodiments, the camera and display features can be built-in, or peripheral. In additional embodiments, the client-computing device 502 can include multiple cameras and/or multiple displays.

As shown in FIG. 5, and as mentioned above, the server device 102 hosts the networking system 104. The networking system 104 provides live video broadcasts, digital media items, networking system posts, electronic messages, etc. to one or more networking system users (e.g., by way of an ephemeral content collection, a newsfeed, a communication thread, a timeline, a "wall," a live video broadcast display, or any other type of graphical user interface). For example, one or more embodiments provide a user with a networking system newsfeed containing posts from one or more networking system co-users associated with the user (e.g., the user's "friends").

In one or more embodiments, a networking system user scrolls through his or her networking system newsfeed in order to view recent networking system posts submitted by the one or more co-users associated with the user via the networking system 104. In one embodiment, the networking system 104 organizes the networking system posts chronologically in a user's networking system newsfeed or wall. In alternative embodiments, the networking system 104 organizes the networking system posts geographically, by interest groups, according to a networking system coefficient between the user and the co-user, etc.

The networking system 104 also enables the user to engage in all other types of networking system activity. For example, the networking system 104 enables a networking system user to view live video broadcasts, scroll through newsfeeds, click on posts and hyperlinks, compose and submit electronic messages and posts, interact with multimedia (e.g., digital photographs and videos), and so forth.

As mentioned above, and as shown in FIG. 5, the networking system 104 includes a broadcast manager 514. In one or more embodiments, the broadcast manager 514 supports all activities involved in streaming a live video broadcast. For example, the broadcast manager 514 receives a live video broadcast stream from the client-computing device 502. As described above, in response to a user of the client-computing device 502 (e.g., the broadcaster) initiating a live video broadcast at the client-computing device 502, the broadcast client 504 provides a camera feed from the client-computing device 502 to the broadcast manager 514. In at least one embodiment, the broadcast manager 514, in turn, provides the received camera feed to one or more networking system users as a live video broadcast in real-time.

The broadcast manager 514 also records a received live video broadcast stream and provides the recording of the video broadcast in various ways. For example, depending on the broadcaster's preferences, the broadcast manager 514 generates and provides the recording of the video broadcast via the broadcaster's ephemeral content collection. In that case, the broadcast manager 514 monitors the threshold amount of time during which the recording is available via the broadcaster's ephemeral content collection (e.g., twenty-four hours), and removes the recording when the threshold amount of time elapses. Additionally or alternatively, the broadcast manager 514 provides the recording of the video broadcast as a networking system post, or makes the recording available via the broadcaster's networking system profile.

Furthermore, in one or more embodiments, the broadcast manager 514 receives, provides, and records networking system activity associated with a live video broadcast. For example, live video broadcast viewers engage in networking system activities (e.g., comments, posts, shares, likes, etc.) in connection with a live video broadcast. Accordingly, the broadcast manager 514 receives data detailing these networking system activities, and provides all of, or a portion of, the received data to the broadcast client 504. For example, in one embodiment, the broadcast manager 514 provides a comment received from a viewer and associated with a live video broadcast to the broadcast client 504 for display to the broadcaster.

Additionally, in at least one embodiment, the broadcast manager 514 receives and records highlight data from the broadcast client 504. As discussed above, in response to the broadcaster indicating a highlighted portion of the live video broadcast, the broadcast client 504 records a starting highlight timestamp and an ending highlight timestamp, and sends the recorded highlight timestamps to the broadcast manager 514. Accordingly, the broadcast manager 514 stores this information for later use in connection with a generated recording of the associated video broadcast.

As mentioned above, and as shown in FIG. 5, the networking system 104 further includes the highlight manager 516. In one or more embodiments, the highlight manager 516 generates metadata in association a recording of a video broadcast indicating one or more highlighted portions of the video broadcast. For example, the highlight manager 516 utilizes the highlight timestamps recorded by the broadcast manager 514 to generate metadata indicating the starting point and ending point for each highlighted portion in the recording of the video broadcast. When a networking system user later views the recording (e.g., via the broadcaster's ephemeral content collection), the broadcast client 504 on the networking system user's client-computing device (e.g., the client-computing device 502) utilizes the generated metadata to indicate to the user where the highlighted portions are within the recording.

In at least one embodiment, the highlight manager 516 automatically and without human intervention determines a highlighted portion in a recorded video broadcast based on networking system activity. For example, if a particular portion of a recording is associated with a threshold amount of networking system activity, the highlight manager 516 determines that that portion is a highlight of the recording. To illustrate, a live video broadcast may not receive any comments or likes from one or more viewers until two minutes into the broadcast, when the networking system 104 receives three comments related to the live video broadcast. There are no additional comments for the remainder of the broadcast. As such, the highlight manager 516 can later determine the portion of the recording associated with the three received comments is a highlighted portion of the recording. Thus, the highlight manager 516 can generate metadata indicating the automatically determined highlighted portions of the recording of the video broadcast in the manner described above.

As shown in FIG. 5, and as mentioned above, the networking system 104 includes the data storage 518. The data storage 518 includes recorded broadcast video data 520. In one or more embodiments, the recorded broadcast video data 520 is representative of recorded broadcast video information, such as described herein.

FIGS. 1-5, the corresponding text and examples, provide a number of different methods, systems, and devices for broadcasting and viewing a live video broadcast. In addition to the foregoing, embodiments can also be described in terms of flowcharts comprising acts and steps in a method for accomplishing a particular result. For example, FIGS. 6-8 may be performed with less or more steps/acts or the steps/acts may be performed in differing orders. Additionally, the steps/acts described herein may be repeated or performed in parallel with one another or in parallel with different instances of the same or similar steps/acts.

Figure 6:
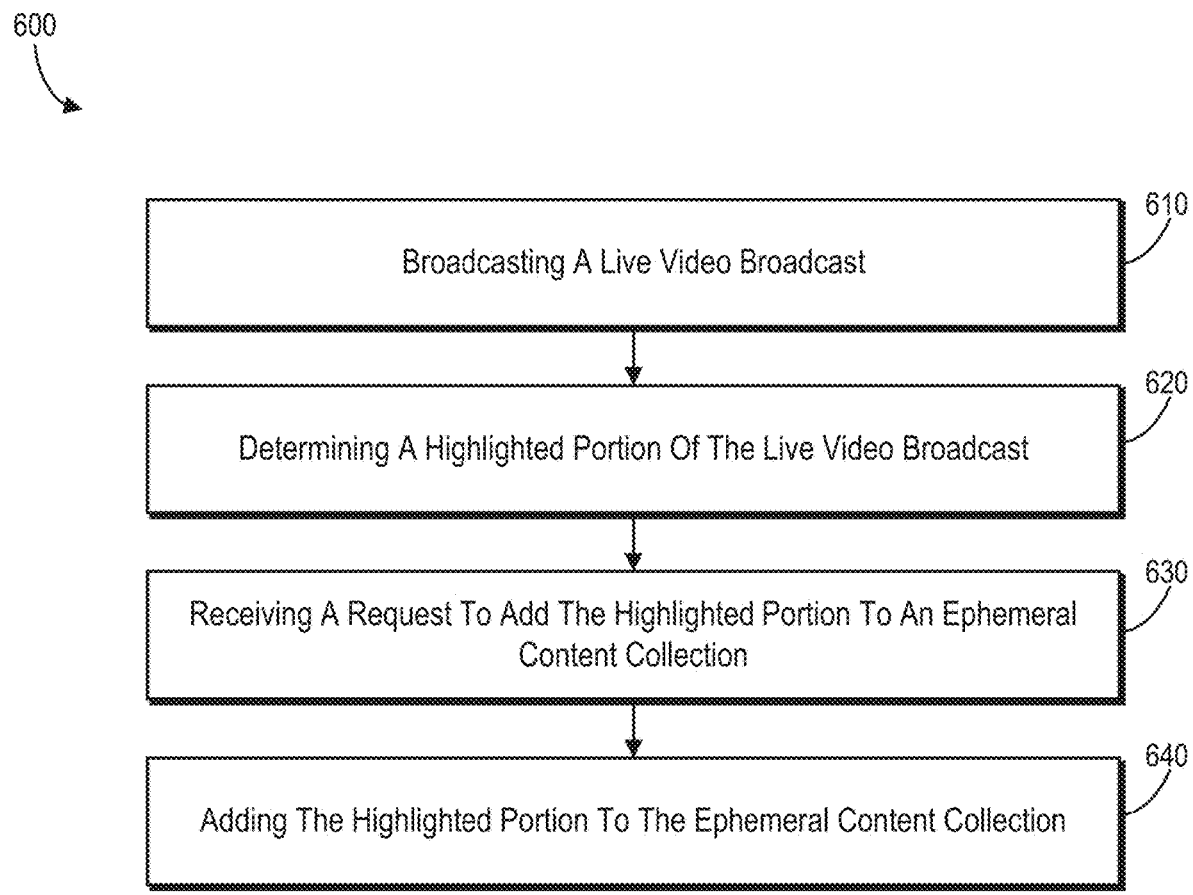
FIG. 6 illustrates a flowchart of a series of acts in a method of highlighting a portion of a live video broadcast in accordance with one or more embodiments.

FIG. 6 illustrates a flowchart of one example method 600 of adding highlighted portions to a recording of a video broadcast. The method 600 includes an act 610 of broadcasting a live video broadcast. In particular, the act 610 can involve broadcasting, via a networking system and to one or more co-users of the networking system user, a live video broadcast received from the networking system user. For example, in one or more embodiments, broadcasting the live video broadcast includes transmitting a video stream from a broadcasting device in real time to one or more viewer devices.

The method 600 also includes an act 620 of determining a highlighted portion of the live video broadcast. In particular, the act 620 can involve determining one or more highlighted portions of the live video broadcast. For example, in one or more embodiments, determining one or more highlighted portions of the live video broadcast includes one of: receiving one or more indications of the one or more highlighted portions, or receiving networking system activity information associated with the live video broadcast. In at least one embodiment, determining one or more highlighted portions of the live video broadcast includes analyzing the received networking system activity information to identify a portion of the live video broadcast associated with a threshold amount of networking system activity, and determining the identified portion of the live video broadcast is a highlighted portion.

Additionally, the method 600 includes an act 630 of receiving a request to add the highlighted portion to an ephemeral content collection. In particular, the act 630 can involve receiving, from the networking system user, a request to add the one or more highlighted portions of the live video broadcast to an ephemeral content collection associated with the networking system user. In one or more embodiments, the ephemeral content collection associated with the networking system user includes one or more digital media items in addition to the highlighted portions of the live video broadcast. In at least one embodiment, receiving one or more indications of highlighted portions of the live video broadcast includes receiving metadata, the metadata can include a starting highlight timestamp and an ending highlight timestamp defining each highlighted portion in the live video broadcast.

The method 600 further includes an act 640 of adding the highlighted portion to the ephemeral content collection. In particular, the act 640 can involve adding the one or more highlighted portions of the live video broadcast to the ephemeral content collection associated with the networking system user. For example, in at least one embodiment, adding the one or more indications of highlighted portions of the live video broadcast to the ephemeral content collection associated with the networking system user is in response to determining the live video broadcast has ended.

Additionally, in at least one embodiment, the method 600 further includes an act of generating, in response to determining the live video broadcast has ended, a recording of the live video broadcast. For example, adding the one or more indications of highlighted portions of the live video broadcast to the ephemeral content collection associated with the networking system user can include adding the recording of the live video broadcast to the ephemeral content collection associated with the networking system user, and configuring playback of the recording to include highlighted portion indicators corresponding to the determined one or more highlighted portions of the live video broadcast. Further, the method 600 can also include acts of determining a threshold amount of time has elapsed since adding the one or more highlighted portions of the live video broadcast to the ephemeral content collection associated with the networking system user, and removing, in response to the threshold amount of time elapsing, the one or more highlighted portions of the live video broadcast from the ephemeral content collection associated with the networking system user.

Figure 7:
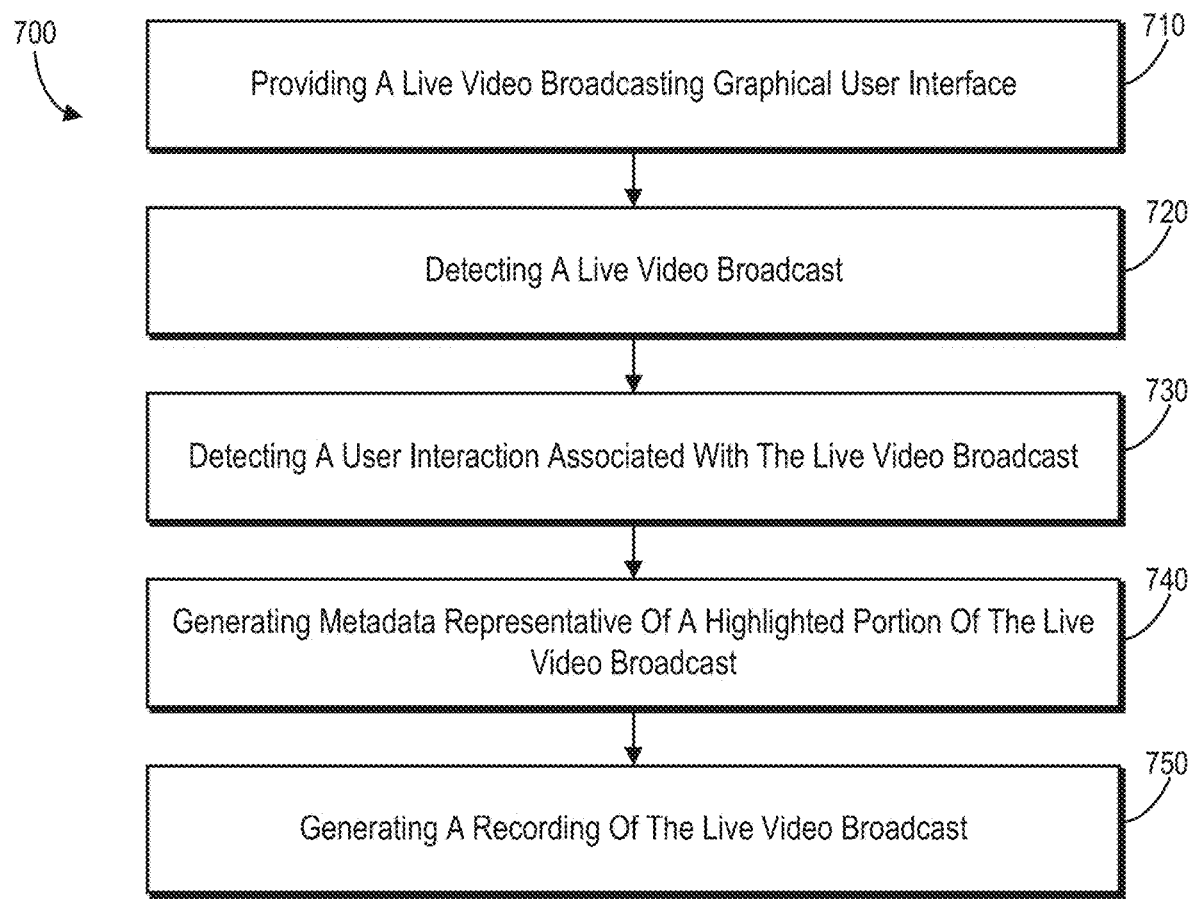
FIG. 7 illustrates a flowchart of a series of acts in a method of indicating a highlighted portion of a live video broadcast in accordance with one or more embodiments.

FIG. 7 illustrates a flowchart of one example method 700 of broadcasting a live video from a broadcasting device. The method 700 includes an act 710 of providing a live video broadcasting graphical user interface. In particular, the act 710 can involve providing, by a broadcasting device, a live video broadcasting graphical user interface including a display of a feed of image frames captured by an active camera associated with the broadcasting device.

Also the method 700 includes an act 720 of detecting a live video broadcast. In particular, the act 720 can involve detecting the initiation of a live video broadcast. In one or more embodiments, detecting the initiation of the live video broadcast includes detecting the transmission of the feed of image frames from the broadcasting device to the networking system.

Furthermore, the method 700 includes an act 730 of detecting a user interaction associated with the live video broadcast. In particular, the act 730 can involve detecting a user interaction indicating a highlighted portion of the live video broadcast. For example, detecting the user interaction indicating a highlighted portion of the live video broadcast can include detecting a touch gesture anywhere in connection with a touch screen display of the broadcasting device. Alternatively, detecting the user interaction indicating a highlighted portion of the live video broadcast can include detecting a user interaction with a display element displayed on the live video broadcasting graphical user interface.

The method 700 also includes an act 740 of generating metadata representative of a highlighted portion of the live video broadcast. In particular, the act 740 can involve generating, in response to the detected user interaction, metadata representative of a duration of the user interaction relative to the duration of the live video broadcast. For example, in one or more embodiments, generating metadata representative of a duration of the user interaction relative to the duration of the live video broadcast includes determining a starting highlight timestamp associated with a detected initiation of the user interaction, determining an ending highlight timestamp associated with a detected end of the user interaction, and generating metadata including the starting highlight timestamp and the ending highlight timestamp.

The method 700 further includes an act 750 of generating a recording of the live video broadcast. In particular, the act 750 can involve generating, in response to a detected end of the live video broadcast, a recording of the live video broadcast, and associating the generated metadata with the recording. For example, in one embodiment, generating the recording of the live video broadcast, and associating the generated metadata with the recording further includes saving the recording and the metadata in a social graph node associated with a user of the broadcasting device.

The method 700 can further include steps of receiving, from a networking system during the live video broadcast, networking system activity information associated with the live video broadcast, and providing, via the live video broadcasting graphical user interface, the networking system activity information in real-time. Additionally, the method 700 can include the step of configuring a request to add the recording of the live video broadcast to an ephemeral content collection associated with a user of the broadcast device, wherein the request includes an indication of whether to display an indication of the highlighted portion of the live video broadcast in the ephemeral content collection.

Figure 8:
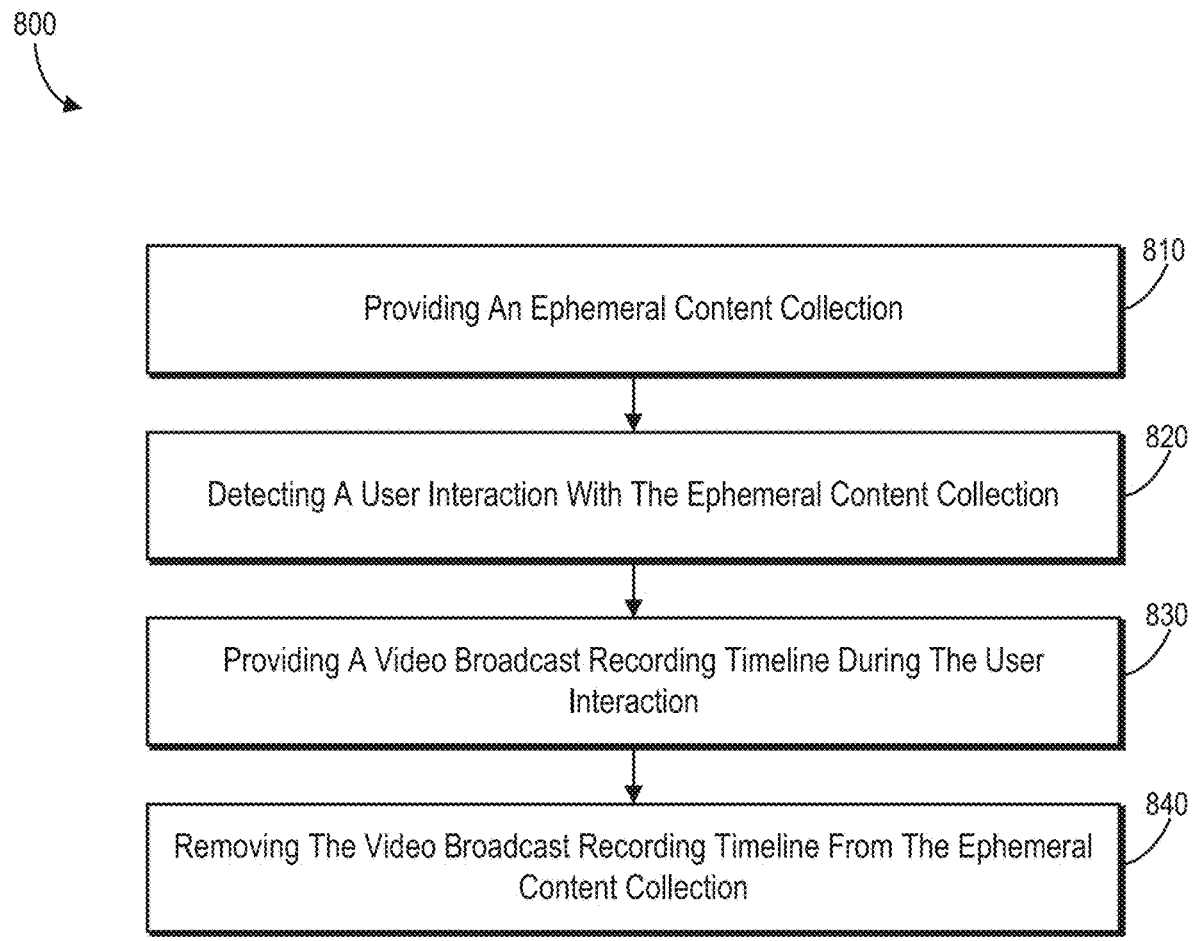
FIG. 8 illustrates a flowchart of a series of acts in a method of displaying a highlighted portion of a live video broadcast in accordance with one or more embodiments.

FIG. 8 illustrates a flowchart of one example method 800 of providing a live video broadcast to a viewer device. The method 800 includes an act 810 of providing an ephemeral content collection. In particular, the 810 can involve providing, by a viewer device, an ephemeral content collection associated with a broadcaster, the ephemeral content collection including a recording of a live video broadcast.

Additionally, the method 800 includes an act 820 of detecting a user interaction with the ephemeral content collection. In particular, the 820 can involve detecting, during playback of the recording of the live video broadcast, a user interaction in association with the ephemeral content collection. For example, detecting the user interaction can include detecting a press-and-hold touch gesture in connection with the ephemeral content collection.

The method 800 further includes an act 830 of providing a video broadcast recording timeline during the user interaction. In particular, the 830 can involve providing, in response to the detected user interaction, a video broadcast recording timeline associated with the recording of the live video broadcast, wherein the video broadcast recording timeline includes a plurality of highlighted portion indicators. For example, in at least one embodiment, providing the video broadcast recording timeline associated with the recording of the live video broadcast includes replacing an ephemeral content collection timeline with the video broadcast recording timeline, wherein the ephemeral content collection timeline includes a plurality of collection segments, each segment corresponding to a digital media item displayed in the ephemeral content collection.

Also, the method 800 includes an act 840 of removing the video broadcast recording timeline from the ephemeral content collection. In particular, the 840 can involve removing, in response to detecting an end of the user interaction, the video broadcast recording timeline from the ephemeral content collection. For example, in at least one embodiment, removing the video broadcast recording timeline includes replacing the video broadcast recording timeline with the ephemeral content collection timeline in response to the end of a press-and-hold touch gesture.

Furthermore, the method 800 can include acts of determining, prior to detecting an end of the user interaction, the user interaction has changed, and scrubbing, in response to determining the user interaction has changed, playback of the recording of the live video broadcast in a manner that corresponds to one or more characteristics of the alteration to the user interaction. For example, in at least one embodiment, determining the user interaction has changed includes determining a swipe touch gesture has occurred in combination with a press-and-hold touch gesture. In some embodiments, scrubbing playback of the recording of the live video broadcast in a manner that corresponds to one or more characteristics of the changed user interaction includes one of fast-forwarding playback of the recording of the live video broadcast in response to a detected swipe-right touch gesture in combination with the press-and-hold touch gesture, or rewinding playback of the recording of the live video broadcast in response to a detected swipe-left touch gesture in combination with the press-and-hold touch gesture.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 9:
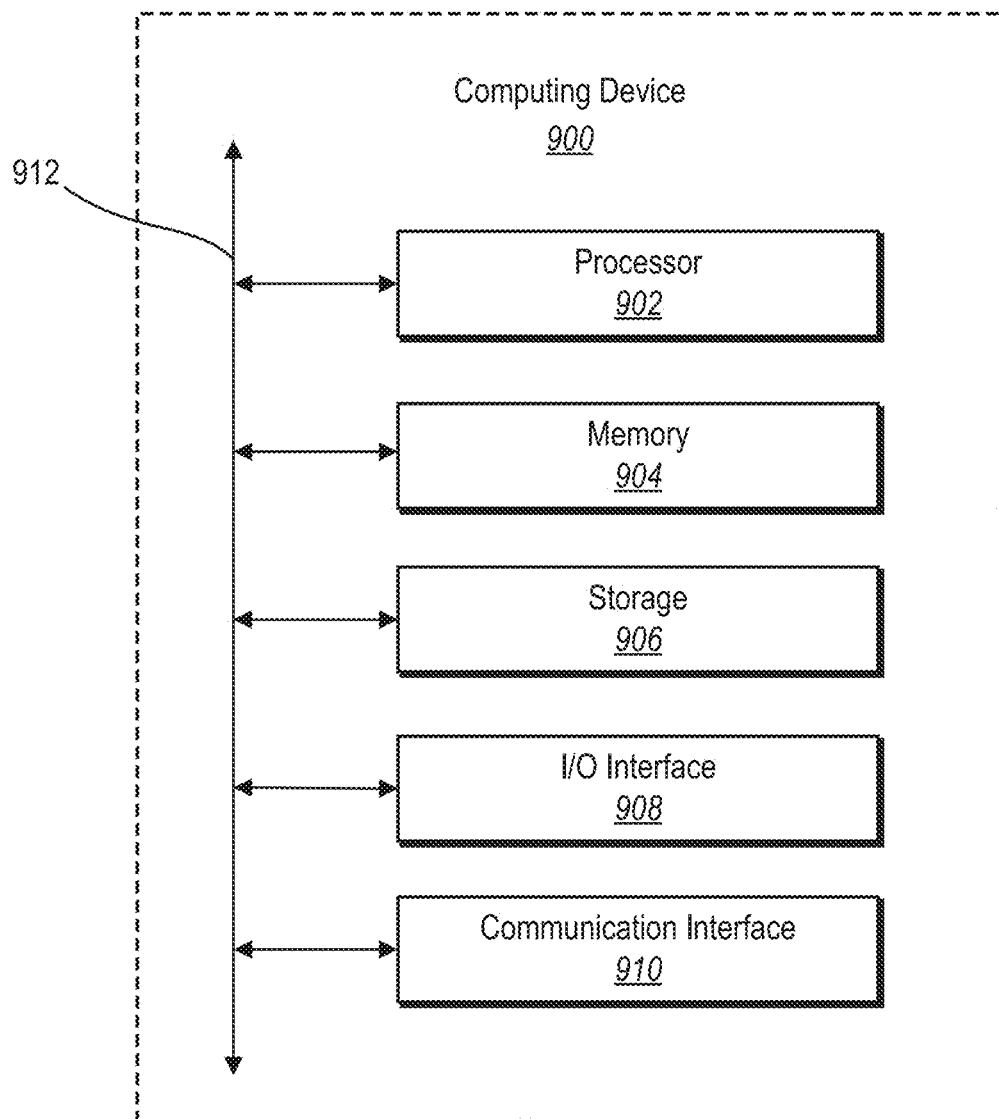
FIG. 9 illustrates a block diagram of an exemplary computing device in accordance with one or more embodiments.

FIG. 9 illustrates a block diagram of exemplary computing device 900 that may be configured to perform one or more of the processes described above. One will appreciate that one or more computing devices such as the computing device 900 may implement the broadcast management system 100. As shown by FIG. 9, the computing device 900 can comprise a processor 902, a memory 904, a storage device 906, an I/O interface 908, and a communication interface 910, which may be communicatively coupled by way of a communication infrastructure 912. While an exemplary computing device 900 is shown in FIG. 9, the components illustrated in FIG. 9 are not intended to be limiting. Additional or alternative components may be used in other embodiments. Furthermore, in certain embodiments, the computing device 900 can include fewer components than those shown in FIG. 9. Components of the computing device 900 shown in FIG. 9 will now be described in additional detail.

In one or more embodiments, the processor 902 includes hardware for executing instructions, such as those making up a computer program. As an example and not by way of limitation, to execute instructions, the processor 902 may retrieve (or fetch) the instructions from an internal register, an internal cache, the memory 904, or the storage device 906 and decode and execute them. In one or more embodiments, the processor 902 may include one or more internal caches for data, instructions, or addresses. As an example and not by way of limitation, the processor 902 may include one or more instruction caches, one or more data caches, and one or more translation lookaside buffers (TLBs). Instructions in the instruction caches may be copies of instructions in the memory 904 or the storage device 906.

The memory 904 may be used for storing data, metadata, and programs for execution by the processor(s). The memory 904 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 904 may be internal or distributed memory.

The storage device 906 includes storage for storing data or instructions. As an example and not by way of limitation, storage device 906 can comprise a non-transitory storage medium described above. The storage device 906 may include a hard disk drive (HDD), a floppy disk drive, flash memory, an optical disc, a magneto-optical disc, magnetic tape, or a Universal Serial Bus (USB) drive or a combination of two or more of these. The storage device 906 may include removable or non-removable (or fixed) media, where appropriate. The storage device 906 may be internal or external to the computing device 900. In one or more embodiments, the storage device 906 is non-volatile, solid-state memory. In other embodiments, the storage device 906 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 908 allows a user to provide input to, receive output from, and otherwise transfer data to and receive data from computing device 900. The I/O interface 908 may include a mouse, a keypad or a keyboard, a touch screen, a camera, an optical scanner, network interface, modem, other known I/O devices or a combination of such I/O interfaces. The I/O interface 908 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 908 is configured to provide graphical data to a display for presentation to a user. The graphical data may be representative of one or more graphical user interfaces and/or any other graphical content as may serve a particular implementation.

The communication interface 910 can include hardware, software, or both. In any event, the communication interface 910 can provide one or more interfaces for communication (such as, for example, packet-based communication) between the computing device 900 and one or more other computing devices or networks. As an example and not by way of limitation, the communication interface 910 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 910 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 910 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 910 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 912 may include hardware, software, or both that couples components of the computing device 900 to each other. As an example and not by way of limitation, the communication infrastructure 912 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the broadcast management system 100 can comprise a social networking system. A social networking system may enable its users (such as persons or organizations) to interact with the system and with each other. The social networking system may, with input from a user, create and store in the social networking system a user profile associated with the user. The user profile may include demographic information, communication-channel information, and information on personal interests of the user. The social networking system may also, with input from a user, create and store a record of relationships of the user with other users of the social networking system, as well as provide services (e.g., posts, photo-sharing, event organization, messaging, games, or advertisements) to facilitate social interaction between or among users.

The social networking system may store records of users and relationships between users in a social graph comprising a plurality of nodes and a plurality of edges connecting the nodes. The nodes may comprise a plurality of user nodes and a plurality of concept nodes. A user node of the social graph may correspond to a user of the social networking system. A user may be an individual (human user), an entity (e.g., an enterprise, business, or third party application), or a group (e.g., of individuals or entities). A user node corresponding to a user may comprise information provided by the user and information gathered by various systems, including the social networking system.

For example, the user may provide his or her name, profile picture, city of residence, contact information, birth date, gender, marital status, family status, employment, educational background, preferences, interests, and other demographic information to be included in the user node. Each user node of the social graph may have a corresponding web page (typically known as a profile page). In response to a request including a user name, the social networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

A concept node may correspond to a concept of the social networking system. For example, a concept can represent a real-world entity, such as a movie, a song, a sports team, a celebrity, a group, a restaurant, or a place or a location. An administrative user of a concept node corresponding to a concept may create or update the concept node by providing information of the concept (e.g., by filling out an online form), causing the social networking system to associate the information with the concept node. For example and without limitation, information associated with a concept can include a name or a title, one or more images (e.g., an image of cover page of a book), a web site (e.g., an URL address) or contact information (e.g., a phone number, an email address). Each concept node of the social graph may correspond to a web page. For example, in response to a request including a name, the social networking system can access a concept node corresponding to the name, and construct a web page including the name and other information associated with the concept.

An edge between a pair of nodes may represent a relationship between the pair of nodes. For example, an edge between two user nodes can represent a friendship between two users. For another example, the social networking system may construct a web page (or a structured document) of a concept node (e.g., a restaurant, a celebrity), incorporating one or more selectable option or selectable elements (e.g., "like", "check in") in the web page. A user can access the page using a web browser hosted by the user's client device and select a selectable option or selectable element, causing the client device to transmit to the social networking system a request to create an edge between a user node of the user and a concept node of the concept, indicating a relationship between the user and the concept (e.g., the user checks in a restaurant, or the user "likes" a celebrity).

As an example, a user may provide (or change) his or her city of residence, causing the social networking system to create an edge between a user node corresponding to the user and a concept node corresponding to the city declared by the user as his or her city of residence. In addition, the degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends."

A social networking system may support a variety of applications, such as photo sharing, on-line calendars and events, gaming, instant messaging, and advertising. For example, the social networking system may also include media sharing capabilities. Also, the social networking system may allow users to post photographs and other multi-media content items to a user's profile page (typically known as "wall posts" or "timeline posts") or in a photo album, both of which may be accessible to other users of the social networking system depending upon the user's configured privacy settings. The social networking system may also allow users to configure events. For example, a first user may configure an event with attributes including time and date of the event, location of the event and other users invited to the event. The invited users may receive invitations to the event and respond (such as by accepting the invitation or declining it). Furthermore, the social networking system may allow users to maintain a personal calendar. Similarly to events, the calendar entries may include times, dates, locations and identities of other users.

Figure 10:
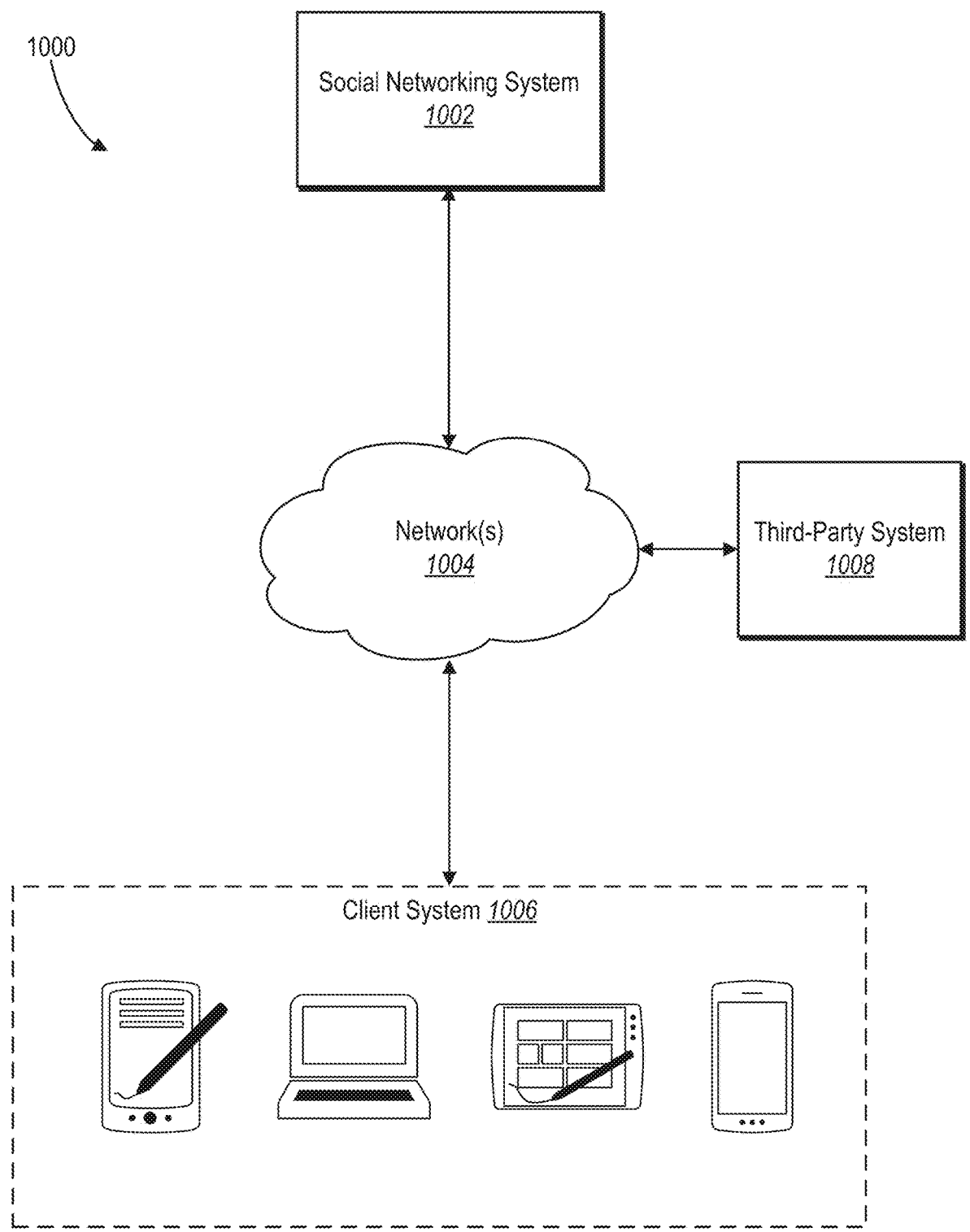
FIG. 10 illustrates an example network environment of a social networking system in accordance with one or more embodiments.

FIG. 10 illustrates an example network environment 1000 of a social networking system. Network environment 1000 includes a client device 1006, a networking system 1002, and a third-party system 1008 connected to each other by a network 1004. Although FIG. 10 illustrates a particular arrangement of client device 1006, networking system 1002, third-party system 1008, and network 1004, this disclosure contemplates any suitable arrangement of client device 1006, networking system 1002, third-party system 1008, and network 1004. As an example and not by way of limitation, two or more of client device 1006, networking system 1002, and third-party system 1008 may be connected to each other directly, bypassing network 1004. As another example, two or more of client device 1006, networking system 1002, and third-party system 1008 may be physically or logically co-located with each other in whole or in part. Moreover, although FIG. 10 illustrates a particular number of client devices 1006, networking systems 1002, third-party systems 1008, and networks 1004, this disclosure contemplates any suitable number of client devices 1006, networking systems 1002, third-party systems 1008, and networks 1004. As an example and not by way of limitation, network environment 1000 may include multiple client device 1006, networking systems 1002, third-party systems 1008, and networks 1004.

This disclosure contemplates any suitable network 1004. As an example and not by way of limitation, one or more portions of network 1004 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1004 may include one or more networks 1004.

Links may connect client device 1006, networking system 1002, and third-party system 1008 to communication network 1004 or to each other. This disclosure contemplates any suitable links. In particular embodiments, one or more links include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1000. One or more first links may differ in one or more respects from one or more second links.

In particular embodiments, client device 1006 may be an electronic device including hardware, software, or embedded logic components or a combination of two or more such components and capable of carrying out the appropriate functionalities implemented or supported by client device 1006. As an example and not by way of limitation, a client device 1006 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1006. A client device 1006 may enable a network user at client device 1006 to access network 1004. A client device 1006 may enable its user to communicate with other users at other client devices 1006.

In particular embodiments, client device 1006 may include a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client device 1006 may enter a Uniform Resource Locator (URL) or other address directing the web browser to a particular server (such as server, or a server associated with a third-party system 1008), and the web browser may generate a Hyper Text Transfer Protocol (HTTP) request and communicate the HTTP request to server. The server may accept the HTTP request and communicate to client device 1006 one or more Hyper Text Markup Language (HTML) files responsive to the HTTP request. Client device 1006 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1002 may be a network-addressable computing system that can host an online social network. Networking system 1002 may generate, store, receive, and send social-networking data, such as, for example, user-profile data, concept-profile data, social-graph information, or other suitable data related to the online social network. Networking system 1002 may be accessed by the other components of network environment 1000 either directly or via network 1004. In particular embodiments, networking system 1002 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1002 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1006, a networking system 1002, or a third-party system 1008 to manage, retrieve, modify, add, or delete, the information stored in data store.

In particular embodiments, networking system 1002 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1002 may provide users of the online social network the ability to communicate and interact with other users. In particular embodiments, users may join the online social network via networking system 1002 and then add connections (e.g., relationships) to a number of other users of networking system 1002 that they want to be connected to. Herein, the term "friend" may refer to any other user of networking system 1002 with whom a user has formed a connection, association, or relationship via networking system 1002.

In particular embodiments, networking system 1002 may provide users with the ability to take actions on various types of items or objects, supported by networking system 1002. As an example and not by way of limitation, the items and objects may include groups or social networks to which users of networking system 1002 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1002 or by an external system of third-party system 1008, which is separate from networking system 1002 and coupled to networking system 1002 via a network 1004.

In particular embodiments, networking system 1002 may be capable of linking a variety of entities. As an example and not by way of limitation, networking system 1002 may enable users to interact with each other as well as receive content from third-party systems 1008 or other entities, or to allow users to interact with these entities through an application programming interfaces (API) or other communication channels.

In particular embodiments, a third-party system 1008 may include one or more types of servers, one or more data stores, one or more interfaces, including but not limited to APIs, one or more web services, one or more content sources, one or more networks, or any other suitable components, e.g., that servers may communicate with. A third-party system 1008 may be operated by a different entity from an entity operating networking system 1002. In particular embodiments, however, networking system 1002 and third-party systems 1008 may operate in conjunction with each other to provide social-networking services to users of networking system 1002 or third-party systems 1008. In this sense, networking system 1002 may provide a platform, or backbone, which other systems, such as third-party systems 1008, may use to provide social-networking services and functionality to users across the Internet.

In particular embodiments, a third-party system 1008 may include a third-party content object provider. A third-party content object provider may include one or more sources of content objects, which may be communicated to a client device 1006. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1002 also includes user-generated content objects, which may enhance a user's interactions with networking system 1002. User-generated content may include anything a user can add, upload, send, or "post" to networking system 1002. As an example and not by way of limitation, a user communicates posts to networking system 1002 from a client device 1006. Posts may include data such as status updates or other textual data, location information, photos, videos, links, music or other similar data or media. Content may also be added to networking system 1002 by a third-party through a "communication channel," such as a newsfeed or stream.

In particular embodiments, networking system 1002 may include a variety of servers, sub-systems, programs, modules, logs, and data stores. In particular embodiments, networking system 1002 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1002 may also include suitable components such as network interfaces, security mechanisms, load balancers, failover servers, management-and-network-operations consoles, other suitable components, or any suitable combination thereof. In particular embodiments, networking system 1002 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1002 to one or more client devices 1006 or one or more third-party system 1008 via network 1004. The web server may include a mail server or other messaging functionality for receiving and routing messages between networking system 1002 and one or more client devices 1006. An API-request server may allow a third-party system 1008 to access information from networking system 1002 by calling one or more APIs. An action logger may be used to receive communications from a web server about a user's actions on or off networking system 1002. In conjunction with the action log, a third-party-content-object log may be maintained of user exposures to third-party-content objects. A notification controller may provide information regarding content objects to a client device 1006. Information may be pushed to a client device 1006 as notifications, or information may be pulled from client device 1006 responsive to a request received from client device 1006. Authorization servers may be used to enforce one or more privacy settings of the users of networking system 1002. A privacy setting of a user determines how particular information associated with a user can be shared. The authorization server may allow users to opt in to or opt out of having their actions logged by networking system 1002 or shared with other systems (e.g., third-party system 1008), such as, for example, by setting appropriate privacy settings. Third-party-content-object stores may be used to store content objects received from third parties, such as a third-party system 1008. Location stores may be used for storing location information received from client devices 1006 associated with users. Advertisement-pricing modules may combine social information, the current time, location information, or other suitable information to provide relevant advertisements, in the form of notifications, to a user.

Figure 11:
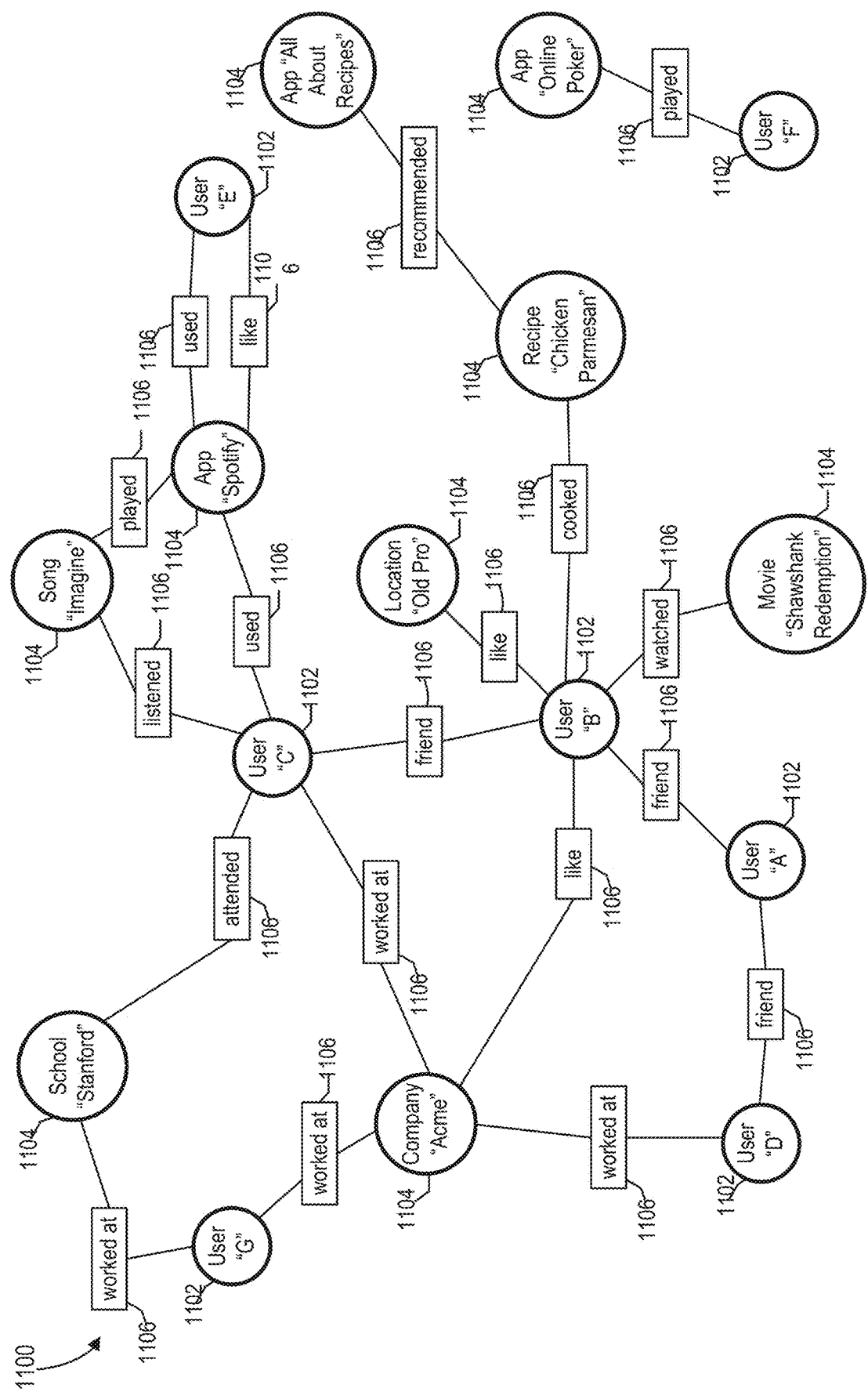
FIG. 11 illustrates a social graph in accordance with one or more embodiments.

FIG. 11 illustrates example social graph 1100. In particular embodiments, networking system 1002 may store one or more social graphs 1100 in one or more data stores. In particular embodiments, social graph 1100 may include multiple nodes—which may include multiple user nodes 1102 or multiple concept nodes 1104—and multiple edges 1106 connecting the nodes. Example social graph 1100 illustrated in FIG. 11 is shown, for didactic purposes, in a two-dimensional visual map representation. In particular embodiments, a networking system 1002, client device 1006, or third-party system 1008 may access social graph 1100 and related social-graph information for suitable applications. The nodes and edges of social graph 1100 may be stored as data objects, for example, in a data store (such as a social-graph database). Such a data store may include one or more searchable or query able indexes of nodes or edges of social graph 1100.

In particular embodiments, a user node 1102 may correspond to a user of networking system 1002. As an example and not by way of limitation, a user may be an individual (human user), an entity (e.g., an enterprise, business, or third-party application), or a group (e.g., of individuals or entities) that interacts or communicates with or over networking system 1002. In particular embodiments, when a user registers for an account with networking system 1002, networking system 1002 may create a user node 1102 corresponding to the user, and store the user node 1102 in one or more data stores. Users and user nodes 1102 described herein may, where appropriate, refer to registered users and user nodes 1102 associated with registered users. In addition or as an alternative, users and user nodes 1102 described herein may, where appropriate, refer to users that have not registered with networking system 1002. In particular embodiments, a user node 1102 may be associated with information provided by a user or information gathered by various systems, including networking system 1002. As an example and not by way of limitation, a user may provide his or her name, profile picture, contact information, birth date, sex, marital status, family status, employment, education background, preferences, interests, or other demographic information. In particular embodiments, a user node 1102 may be associated with one or more data objects corresponding to information associated with a user. In particular embodiments, a user node 1102 may correspond to one or more webpages.

In particular embodiments, a concept node 1104 may correspond to a concept. As an example and not by way of limitation, a concept may correspond to a place (such as, for example, a movie theater, restaurant, landmark, or city); a website (such as, for example, a website associated with networking system 1002 or a third-party website associated with a web-application server); an entity (such as, for example, a person, business, group, sports team, or celebrity); a resource (such as, for example, an audio file, video file, digital photo, text file, structured document, or application) which may be located within networking system 1002 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1104 may be associated with information of a concept provided by a user or information gathered by various systems, including networking system 1002. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1104 may be associated with one or more data objects corresponding to information associated with concept node 1104. In particular embodiments, a concept node 1104 may correspond to one or more webpages.

In particular embodiments, a node in social graph 1100 may represent or be represented by a webpage (which may be referred to as a "profile page"). Profile pages may be hosted by or accessible to networking system 1002. Profile pages may also be hosted on third-party websites associated with a third-party system 1008. As an example and not by way of limitation, a profile page corresponding to a particular external webpage may be the particular external webpage and the profile page may correspond to a particular concept node 1104. Profile pages may be viewable by all or a selected subset of other users. As an example and not by way of limitation, a user node 1102 may have a corresponding user-profile page in which the corresponding user may add content, make declarations, or otherwise express himself or herself. As another example and not by way of limitation, a concept node 1104 may have a corresponding concept-profile page in which one or more users may add content, make declarations, or express themselves, particularly in relation to the concept corresponding to concept node 1104.

In particular embodiments, a concept node 1104 may represent a third-party webpage or resource hosted by a third-party system 1008. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1006 to send to networking system 1002 a message indicating the user's action. In response to the message, networking system 1002 may create an edge (e.g., an "eat" edge) between a user node 1102 corresponding to the user and a concept node 1104 corresponding to the third-party webpage or resource and store edge 1106 in one or more data stores.

In particular embodiments, a pair of nodes in social graph 1100 may be connected to each other by one or more edges 1106. An edge 1106 connecting a pair of nodes may represent a relationship between the pair of nodes. In particular embodiments, an edge 1106 may include or represent one or more data objects or attributes corresponding to the relationship between a pair of nodes. As an example and not by way of limitation, a first user may indicate that a second user is a "friend" of the first user. In response to this indication, networking system 1002 may send a "friend request" to the second user. If the second user confirms the "friend request," networking system 1002 may create an edge 1106 connecting the first user's user node 1102 to the second user's user node 1102 in social graph 1100 and store edge 1106 as social-graph information in one or more of data stores. In the example of FIG. 11, social graph 1100 includes an edge 1106 indicating a friend relation between user nodes 1102 of user "A" and user "B" and an edge indicating a friend relation between user nodes 1102 of user "C" and user "B." Although this disclosure describes or illustrates particular edges 1106 with particular attributes connecting particular user nodes 1102, this disclosure contemplates any suitable edges 1106 with any suitable attributes connecting user nodes 1102. As an example and not by way of limitation, an edge 1106 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1100 by one or more edges 1106.

In particular embodiments, an edge 1106 between a user node 1102 and a concept node 1104 may represent a particular action or activity performed by a user associated with user node 1102 toward a concept associated with a concept node 1104. As an example and not by way of limitation, as illustrated in FIG. 11, a user may "like," "attended," "played," "listened," "cooked," "worked at," or "watched" a concept, each of which may correspond to an edge type or subtype. A concept-profile page corresponding to a concept node 1104 may include, for example, a selectable "check in" icon (such as, for example, a clickable "check in" icon) or a selectable "add to favorites" icon. Similarly, after a user clicks these icons, networking system 1002 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, networking system 1002 may create a "listened" edge 1106 and a "used" edge (as illustrated in FIG. 11) between user nodes 1102 corresponding to the user and concept nodes 1104 corresponding to the song and application to indicate that the user listened to the song and used the application. Moreover, networking system 1002 may create a "played" edge 1106 (as illustrated in FIG. 11) between concept nodes 1104 corresponding to the song and the application to indicate that the particular song was played by the particular application. In this case, "played" edge 1106 corresponds to an action performed by an external application (SPOTIFY) on an external audio file (the song "Imagine"). Although this disclosure describes particular edges 1106 with particular attributes connecting user nodes 1102 and concept nodes 1104, this disclosure contemplates any suitable edges 1106 with any suitable attributes connecting user nodes 1102 and concept nodes 1104. Moreover, although this disclosure describes edges between a user node 1102 and a concept node 1104 representing a single relationship, this disclosure contemplates edges between a user node 1102 and a concept node 1104 representing one or more relationships. As an example and not by way of limitation, an edge 1106 may represent both that a user likes and has used at a particular concept. Alternatively, another edge 1106 may represent each type of relationship (or multiples of a single relationship) between a user node 1102 and a concept node 1104 (as illustrated in FIG. 11 between user node 1102 for user "E" and concept node 1104 for "SPOTIFY").

In particular embodiments, networking system 1002 may create an edge 1106 between a user node 1102 and a concept node 1104 in social graph 1100. As an example and not by way of limitation, a user viewing a concept-profile page (such as, for example, by using a web browser or a special-purpose application hosted by the user's client device 1006) may indicate that he or she likes the concept represented by the concept node 1104 by clicking or selecting a "Like" icon, which may cause the user's client device 1006 to send to networking system 1002 a message indicating the user's liking of the concept associated with the concept-profile page. In response to the message, networking system 1002 may create an edge 1106 between user node 1102 associated with the user and concept node 1104, as illustrated by "like" edge 1106 between the user and concept node 1104. In particular embodiments, networking system 1002 may store an edge 1106 in one or more data stores. In particular embodiments, an edge 1106 may be automatically formed by networking system 1002 in response to a particular user action. As an example and not by way of limitation, if a first user uploads a picture, watches a movie, or listens to a song, an edge 1106 may be formed between user node 1102 corresponding to the first user and concept nodes 1104 corresponding to those concepts. Although this disclosure describes forming particular edges 1106 in particular manners, this disclosure contemplates forming any suitable edges 1106 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1002). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1002 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1002) or RSVP (e.g., through networking system 1002) to an event associated with the advertisement. In addition or as an alternative, an advertisement may include social-networking-system context directed to the user. As an example and not by way of limitation, an advertisement may display information about a friend of the user within networking system 1002 who has taken an action associated with the subject matter of the advertisement.

In particular embodiments, networking system 1002 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1008 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1002 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1002 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1002 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1002 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1002 may calculate a coefficient based on a user's actions. Networking system 1002 may monitor such actions on the online social network, on a third-party system 1008, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1002 may calculate a coefficient based on the user's actions with particular types of content. The content may be associated with the online social network, a third-party system 1008, or another suitable system. The content may include users, profile pages, posts, news stories, headlines, instant messages, chat room conversations, emails, advertisements, pictures, video, music, other suitable objects, or any combination thereof. Networking system 1002 may analyze a user's actions to determine whether one or more of the actions indicate an affinity for subject matter, content, other users, and so forth. As an example and not by way of limitation, if a user may make frequently posts content related to "coffee" or variants thereof, networking system 1002 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1002 may calculate a coefficient based on the type of relationship between particular objects. Referencing the social graph 1100, networking system 1002 may analyze the number and/or type of edges 1106 connecting particular user nodes 1102 and concept nodes 1104 when calculating a coefficient. As an example and not by way of limitation, user nodes 1102 that are connected by a spouse-type edge (representing that the two users are married) may be assigned a higher coefficient than a user node 1102 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1002 may determine that the user has a higher coefficient with respect to the first photo than the second photo because having a tagged-in-type relationship with content may be assigned a higher weight and/or rating than having a like-type relationship with content. In particular embodiments, networking system 1002 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1002 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1100. As an example and not by way of limitation, social-graph entities that are closer in the social graph 1100 (i.e., fewer degrees of separation) may have a higher coefficient than entities that are further apart in the social graph 1100.

In particular embodiments, networking system 1002 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1006 of the user). A first user may be more interested in other users or concepts that are closer to the first user. As an example and not by way of limitation, if a user is one mile from an airport and two miles from a gas station, networking system 1002 may determine that the user has a higher coefficient for the airport than the gas station based on the proximity of the airport to the user.

In particular embodiments, networking system 1002 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1002 may provide information that is relevant to user's interests and current circumstances, increasing the likelihood that they will find such information of interest. In particular embodiments, networking system 1002 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1002 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1002 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1008 (e.g., via an API or other communication channel), or from another suitable system. In response to the request, networking system 1002 may calculate the coefficient (or access the coefficient information if it has previously been calculated and stored). In particular embodiments, networking system 1002 may measure an affinity with respect to a particular process. Different processes (both internal and external to the online social network) may request a coefficient for a particular object or set of objects. Networking system 1002 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1004 corresponding to a particular photo may have a privacy setting specifying that the photo may only be accessed by users tagged in the photo and their friends. In particular embodiments, privacy settings may allow users to opt in or opt out of having their actions logged by networking system 1002 or shared with other systems (e.g., third-party system 1008). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1008, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1002 may send a request to the data store for the object. The request may identify the user associated with the request and may only be sent to the user (or a client device 1006 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium storing instructions that, when executed by at least one processor, cause a system to:
broadcast, via a networking system and to one or more co-users of a networking system user, a live video broadcast received from the networking system user;
determine, during the live video broadcast, a highlighted portion of the live video broadcast in response to receiving user input indicative of a highlighted portion;
present to the networking system user a set of sharing options comprising an option to share an unhighlighted full version of the live video broadcast and an option to share the highlighted portion determined in response to receiving the user input indicated during the live video broadcast;
receive, from the networking system user, a request based on a selected option from the set of sharing options to post the highlighted portion of the live video broadcast to an account associated with the networking system user; and
post, in response to the request, the highlighted portion of the live video broadcast to the account associated with the networking system user.

2. The non-transitory computer-readable medium of claim 1, further comprising instructions that, when executed by the at least one processor, cause the system to provide, for display within a graphical user interface, one or more user interface elements for posting, along with the highlighted portion, a comment related to the highlighted portion to the account associated with the networking system user.

3. The non-transitory computer-readable medium of claim 1, further comprising instructions that, when executed by the at least one processor, cause the system to determine the highlighted portion of the live video broadcast by receiving the user input via a graphical user interface of a broadcasting computing device, the user input defining at least one of a start point or an end point of the highlighted portion.

4. The non-transitory computer-readable medium of claim 3, further comprising instructions that, when executed by the at least one processor, cause the system to determine the highlighted portion which comprises a predetermined duration of the live video broadcast beginning from the start point.

5. The non-transitory computer-readable medium of claim 3, further comprising instructions that, when executed by the at least one processor, cause the system to add, to the highlighted portion, a portion of content from the live video broadcast that corresponds to at least one of a first segment immediately prior to the start point or a second segment immediately after the end point.

6. The non-transitory computer-readable medium of claim 1, further comprising instructions that, when executed by the at least one processor, cause the system to generate one or more networking system tags in relation to the highlighted portion of the live video broadcast.

7. The non-transitory computer-readable medium of claim 1, further comprising instructions that, when executed by the at least one processor, cause the system to modify the highlighted portion of the live video broadcast in response to receiving an indication of one or more user interactions to edit the highlighted portion.

8. A system comprising:
at least one processor; and
at least one non-transitory computer-readable storage medium storing instructions that, when executed by the at least one processor, cause the system to:
broadcast, via a networking system and to one or more co-users of a networking system user, a live video broadcast received from the networking system user;
determine, during the live video broadcast, a highlighted portion of the live video broadcast in response to receiving user input indicative of a highlighted portion;
present to the networking system user a set of sharing options comprising an option to share an unhighlighted full version of the live video broadcast and an option to share the highlighted portion determined in response to receiving the user input indicated during the live video broadcast;
receive, from the networking system user, a request based on a selected option from the set of sharing options to post the highlighted portion of the live video broadcast to an account associated with the networking system user; and
post, in response to the request, the highlighted portion of the live video broadcast to the account associated with the networking system user.

9. The system of claim 8, further comprising instructions that, when executed by the at least one processor, cause the system to provide, for display within a graphical user interface, one or more user interface elements for posting, along with the highlighted portion, a comment related to the highlighted portion to the account associated with the networking system user.

10. The system of claim 8, further comprising instructions that, when executed by the at least one processor, cause the system to determine the highlighted portion of the live video broadcast by receiving the user input via a graphical user interface of a broadcasting computing device, the user input defining at least one of a start point or an end point of the highlighted portion.

11. The system of claim 10, further comprising instructions that, when executed by the at least one processor, cause the system to determine the highlighted portion which comprises a predetermined duration of the live video broadcast beginning from the start point.

12. The system of claim 10, further comprising instructions that, when executed by the at least one processor, cause the system to add, to the highlighted portion, a portion of content from the live video broadcast that corresponds to at least one of a first segment immediately prior to the start point or a second segment immediately after the end point.

13. The system of claim 8, further comprising instructions that, when executed by the at least one processor, cause the system to generate one or more networking system tags in relation to the highlighted portion of the live video broadcast.

14. The system of claim 8, further comprising instructions that, when executed by the at least one processor, cause the system to modify the highlighted portion of the live video broadcast in response to receiving an indication of one or more user interactions to edit the highlighted portion.

15. A method comprising:
broadcasting, via a networking system and to one or more co-users of a networking system user, a live video broadcast received from the networking system user;
determining, during the live video broadcast, a highlighted portion of the live video broadcast in response to receiving user input indicative of a highlighted portion;
presenting to the networking system user a set of sharing options comprising an option to share an unhighlighted full version of the live video broadcast and an option to share the highlighted portion determined in response to receiving the user input indicated during the live video broadcast;

receiving, from the networking system user, a request based on a selected option from the set of sharing options to post the highlighted portion of the live video broadcast to an account associated with the networking system user; and posting, in response to the request, the highlighted portion of the live video broadcast to the account associated with the networking system user.

16. The method of claim 15, further comprising providing, for display within a graphical user interface, one or more user interface elements for posting, along with the highlighted portion, a comment related to the highlighted portion to the account associated with the networking system user.

17. The method of claim 15, wherein determining the highlighted portion of the live video broadcast comprises receiving the user input via a graphical user interface of a broadcasting computing device, the user input defining at least one of a start point or an end point of the highlighted portion.

18. The method of claim 17, wherein the highlighted portion comprises a predetermined duration of the live video broadcast beginning from the start point.

19. The method of claim 17, further comprising adding, to the highlighted portion, a portion of content from the live video broadcast that corresponds to at least one of a first segment immediately prior to the start point or a second segment immediately after the end point.

20. The method of claim 15, further comprising modifying the highlighted portion of the live video broadcast in response to receiving an indication of one or more user interactions to edit the highlighted portion.

* * * * *